(12) United States Patent
Belharouak et al.

(10) Patent No.: US 12,187,610 B2
(45) Date of Patent: Jan. 7, 2025

(54) SODIUM METAL VANADIUM FLUOROPHOSPHATES MATERIALS AS POSITIVE ELECTRODE FOR SODIUM ION BATTERIES

(71) Applicant: UT Battelle, LLC, Oak Ridge, TN (US)

(72) Inventors: Ilias Belharouak, Oak Ridge, TN (US); Ruhul Amin, Oak Ridge, TN (US); Rachid Essehli, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 279 days.

(21) Appl. No.: 17/347,751

(22) Filed: Jun. 15, 2021

(65) Prior Publication Data
US 2021/0395088 A1    Dec. 23, 2021

Related U.S. Application Data

(60) Provisional application No. 63/040,021, filed on Jun. 17, 2020.

(51) Int. Cl.
| | |
|---|---|
| *H01M 10/36* | (2010.01) |
| *C01B 25/455* | (2006.01) |
| *H01M 4/36* | (2006.01) |
| *H01M 4/38* | (2006.01) |
| *H01M 4/583* | (2010.01) |
| *H01M 4/02* | (2006.01) |

(52) U.S. Cl.
CPC ......... *C01B 25/455* (2013.01); *H01M 4/364* (2013.01); *H01M 4/38* (2013.01); *H01M 4/583* (2013.01); *H01M 10/36* (2013.01); *H01M 2004/027* (2013.01); *H01M 2004/028* (2013.01)

(58) Field of Classification Search
CPC ........ H01M 4/364; H01M 4/38; H01M 4/583; H01M 10/36; H01M 2004/027; H01M 2004/028; C01B 25/455
See application file for complete search history.

(56) References Cited

U.S. PATENT DOCUMENTS

| | | | |
|---|---|---|---|
| 2017/0214035 A1* | 7/2017 | Xu ........................ | H01M 4/043 |
| 2018/0358620 A1* | 12/2018 | O'Neil ................. | H01M 4/663 |
| 2019/0148729 A1* | 5/2019 | Essehli ................. | H01M 4/136 |
| | | | 429/209 |

FOREIGN PATENT DOCUMENTS

CN    109755565 A  *  5/2019  ............. H01M 4/58

OTHER PUBLICATIONS

CN109755565A. May 14, 2019. English machine translation by EPO. (Year: 2019).*

(Continued)

*Primary Examiner* — James Lee
(74) *Attorney, Agent, or Firm* — WARNER NORCROSS + JUDD LLP

(57) ABSTRACT

A positive electrode for a sodium ion battery is provided. The positive electrode includes a sodium metal vanadium fluorophosphate having a formula according to Formula I:

$$Na_3V_{2-x}M_xO_y(PO_4)_2F_{3-y} \qquad I;$$

wherein $0<x\leq 1$, $0\leq y\leq 1$, and M is one or more additional metals.

24 Claims, 22 Drawing Sheets

(56) References Cited

OTHER PUBLICATIONS

Nguyen et al. "Monitoring the Crystal Structure and the Electrochemical Properties of Na3(VO)2(PO4)2F through Fe3+ Substitution." ACS Applied Materials & Interfaces, vol. 11, No. 42, Sep. 27, 2019, pp. 38808-38818, https://doi.org/10.1021/acsami.9b14249. (Year: 2019).*

Olchowka et al. (2019). Aluminum substitution for vanadium in the Na3V2(PO4)2F3 and Na3V2(PO4)2FO2 type materials. Chemical Communications, 55(78), 11719-11722. https://doi.org/10.1039/c9cc05137f. (Year: 2019).*

* cited by examiner

SODIUM METAL VANADIUM FLUOROPHOSPHATES MATERIALS AS POSITIVE ELECTRODE FOR SODIUM ION BATTERIES

CROSS-REFERENCE TO RELATED APPLICATIONS

This application claims the benefit of U.S. Provisional Application 63/040,021, filed Jun. 17, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present disclosure relates to positive electrodes for sodium-ion batteries with the positive electrodes including a sodium metal vanadium fluorophosphate.

BACKGROUND OF THE DISCLOSURE

Electrification of technologies among various industries is limited by the cost, capacity, and stability of the batteries, such as sodium-ion batteries (NaIBs). NaIBs are promising candidates for large-scale energy storage such as grid storage systems because of their low-cost advantages. However, large-scale commercial deployment of NaIBs remains a significant challenge owing to bottlenecks resulting from development of a suitable cathode materials that can enable high power, high energy density, and long cycle life. To address this challenge, several cathode chemistries that feature vanadium phosphate-based materials have been investigated as potential cathode candidates in NaIBs. In particular, cathode classes with a phosphate framework containing $V^{4+}$ and $V^{3+}$ having the general formulas $Na_3V_2(PO_4)_2F_{3-x}O_x$, $NaVOPO_4$, $NaVPO_4F$, $Na_3V_2(PO_4)_3$, $Na_4VO(PO_4)_2$, $Na_7V_4(P_2O_7)_4(PO_4)$, and $Na_3V(PO_3)_3N$ have been investigated. However, vanadium is expensive and subject to environment concerns.

Accordingly, there remains a need for improved cathodes for NaIBs.

SUMMARY OF THE DISCLOSURE

A positive electrode for a sodium ion battery is provided. The positive electrode includes a sodium metal vanadium fluorophosphate having a formula according to Formula I.

$$Na_3V_{2-x}M_xO_y(PO_4)_2F_{3-y} \qquad \text{I};$$

wherein $0<x\leq1$, $0\leq y\leq1$, and M is one or more additional metals.

In certain embodiments, the one or more additional metals of the positive electrode tri-valent metals including, but not limited to, iron (Fe), chromium (Cr), aluminum (Al), indium (In), titanium (Ti), manganese (Mn), yttrium (Y), or combinations thereof. The positive electrode may be utilized for rechargeable sodium-ion batteries (NaIBs).

In some exemplary embodiments, the positive electrode may include an iron-doped $Na_3Fe_{0.3}V_{1.7}O(PO_4)_2F_2$ compound formed utilizing a facile hydrothermal route. The positive electrode may be formed from stoichiometric mixtures of NaF, $NH_4VO_3$, $M(CH_3COO)_3 \cdot xH_2O$, $NH_4H_2PO_4$, and $C_6H_8O_7$ (citric acid). Citric acid may be utilized as a carbon source and reducing agent. First, $NH_4VO_3$ and citric acid may be combined in water to form Solution A. $M(CH_3COO)_3 \cdot xH_2O$ may be added to Solution A to form Solution B. The NaF and $NH_4H_2PO_4$ may be combined in water to form Solution C. Solution C may then added dropwise to the Solution B under continuous stirring to form Solution D. Solution D is then heated for a predetermined period of time. After filtering Solution D, the resulting powder may be dried for a predetermined period of time under vacuum.

As described above, the positive electrode may be formed by a hydrothermal synthesis route. However, other routes may be utilized. For example, a solid state synthesis route may include combining Solution B and Solution C to form Solution D, and then drying Solution D. The resulting powder may then be calcined at a high temperature. As another example, a sol gel-assisted refluxing route may include combining Solution B and Solution C to form Solution D, and then refluxing for a predetermined amount of time. The resulting solution may then be washed with water and dried for a predetermined amount of time.

The discharge capacity in half-cell configuration of the positive electrode was evaluated and found to be 119, 125, or 130 mAh/g at C/10 while tested using three different electrolyte formulations, DMC-EC-PC, DEC-EC, or EC-PC, respectively. The positive electrode was also evaluated in full-cell configurations, which delivered an initial discharge capacity of 80 mAh/g with $NaTi_2(PO_4)_3$—multi-walled carbon nanotubes (MWCNT) as the negative electrode.

These and other features and advantages of the present invention will become apparent from the following description of the invention, when viewed in accordance with the accompanying drawings and appended claims.

BRIEF DESCRIPTION OF THE FIGURES

Other advantages of the disclosed subject matter will be readily appreciated, as the same becomes better understood by reference to the following detailed description when considered in connection with the accompanying drawings wherein.

DETAILED DESCRIPTION

Figure 1A:
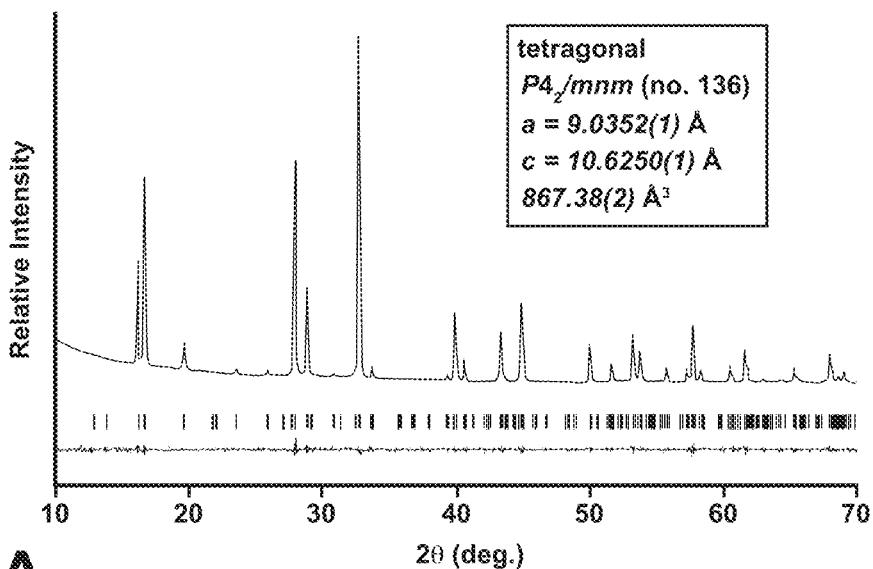
FIG. 1A is a Rietveld refinement results of the XRD pattern.

A positive electrode for a sodium ion battery, and a battery including the same, is provided. The positive electrode includes a sodium metal vanadium fluorophosphate. The positive cathode, and battery comprising the same, may be utilized to expand electrification of technologies among various industries by reducing costs, improving power output, improving density, and extending lifespan. Examples of suitable uses include, but are not limited to, energy storage systems (ESS), behind-the-meter energy storage, charging stations, and uninterruptable power supply (UPS) systems.

The positive electrode has a formula according to Formula I:

$$Na_3V_{2-x}M_xO_y(PO_4)_2F_{3-y} \quad \text{I;}$$
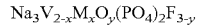

wherein 0<x≤1, 0≤y≤1, and M is one or more additional metals. The variable x may be a number from greater than 0 to 1, optionally from greater than 0 to 0.7, or optionally from 0.2 to 0.4. The variable y may be a number from 0 to 1, optionally 0, or optionally 1. In various embodiments, the additional metal is a trivalent metal. The additional metal may include iron (Fe), chromium (Cr), aluminum (Al), indium (In), titanium (Ti), manganese (Mn), yttrium (Y), gallium (Ga), or combinations thereof.

In certain embodiments, the additional metal is iron (Fe). In these and other embodiments, the sodium metal vanadium fluorophosphate has a formula according to Formula II or Formula III:

$$Na_3V_{1.7}Fe_{0.3}(PO_4)_2F_3 \quad \text{II; or}$$
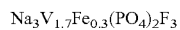

$$Na_3V_{1.7}Fe_{0.3}O(PO_4)_2F_2 \quad \text{III.}$$
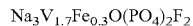

The iron of the sodium metal vanadium fluorophosphate includes iron having an oxidation state of +3. Likewise, the vanadium of the sodium metal vanadium fluorophosphate includes vanadium having an oxidation state of +3. Without being bound by theory, it is believed that the positive cathode including iron (Fe) is suitable as a partial substitute for vanadium (V) due to its low cost, environmental friendliness, and similar ionic radius of 0.645 Å relative to the ionic radius of 0.64 Å for vanadium (V). provides an increased capacity to the cathode relative to conventional cathodes comprising cobalt (Co) and nickel (Ni). Further, it is believed that the positive cathode including iron (Fe) exhibits similar or improved electrochemical performance to conventional positive cathodes including vanadium, but free of iron (Fe).

A method of forming the sodium metal vanadium fluorophosphate is also provided. The method includes combining sodium, vanadium, the additional metal, fluorine, and a phosphate in an aqueous solvent to form a mixture. The method further includes heating the mixture to form the sodium metal vanadium fluorophosphate. In some embodiments, the step of combining includes combining the vanadium, a reducing agent, and the additional metal to form a first solution. The step of combining may further include combining the sodium, the fluorine, and the phosphate to form a second solution. The step of combining may further include combining the first solution and the second solution to form the mixture.

The sodium may include sodium fluoride (NaF), NaOH, $Na_2CO_3$, NaCl, $Na_2O$, sodium acetate ($C_2H_3NaO_2$), trisodium citrate (Na$_3$C$_6$H5O$_7$), sodium oxalate (Na$_2$C$_2$O$_4$), or combinations thereof. In certain embodiments, the sodium includes NaF$_3$. However, it is to be appreciated that any other source of sodium may be utilized so long as the source is compatible with the positive electrode and its precursors.

The vanadium may include ammonium metavanadate (NH$_4$VO$_3$), V$_2$O$_5$, V$_2$O$_3$, VO$_2$, vanadium(III) chloride (VCl$_3$), VOSO$_4$·xH$_2$O, vanadyl acetate (C$_4$H$_8$O$_5$V), vanadium oxalate (C$_4$H$_4$O$_8$V), vanadium acetylacetonate, or combinations thereof. In certain embodiments, the vanadium includes NH$_4$VO$_3$. However, it is to be appreciated that any other source of vanadium may be utilized so long as the source is compatible with the positive electrode and its precursors.

The fluoride may include sodium fluoride (NaF), ammonium fluoride (NH$_4$F), hydrogen fluoride (HF), or combinations thereof. In certain embodiments, the fluoride includes NaF. However, it is to be appreciated that any other source of fluoride may be utilized so long as the source is compatible with the positive electrode and its precursors.

The phosphate may include NH$_4$H$_2$PO$_4$, (NH$_4$)$_2$HPO$_4$, H$_3$PO$_4$, H$_3$PO$_3$, or combinations thereof. In certain embodiments, the vanadium includes NH$_4$H$_2$PO$_4$. However, it is to be appreciated that any other source of phosphate may be utilized so long as the source is compatible with the positive electrode and its precursors.

As described above, the additional metal may include iron (Fe), chromium (Cr), aluminum (Al), indium (In), titanium (Ti), manganese (Mn), yttrium (Y), gallium (Ga), or combinations thereof. However, it is to be appreciated that other metals may be utilized so long as the metal is compatible with the positive electrode and its precursors.

As also described above, in various embodiments, the addition metal is iron (Fe). The iron (Fe) may include Fe(NO$_3$)$_3$·9H$_2$O, FeCl$_3$·nH$_2$O, Fe(SO$_4$)·nH$_2$O, iron(III) acetate, Ferric acetate C$_6$H$_9$FeO$_6$, iron(III) oxalate, Ferric oxalate C$_6$Fe$_2$O$_{12}$, or combinations thereof. In certain embodiments, the iron includes Fe(NO$_3$)$_3$·9H$_2$O. However, it is to be appreciated that any other source of iron may be utilized so long as the source is compatible with the positive electrode and its precursors.

The reducing agent may include citric acid, ascorbic acid, maleic acid, or combinations thereof. In certain embodiments, the reducing agent includes citric acid. However, it is to be appreciated that the reducing agent may be any compound that can donate an electron so long as the source is compatible with the positive electrode and its precursors.

In some exemplary embodiments, the step of combining the vanadium, a reducing agent, and the additional metal to form the first solution includes combining NH$_4$VO$_3$, citric acid (C$_6$H$_8$O$_7$), and iron(III) acetate to form the first solution. Likewise, the step of combining the sodium, the fluorine, and the phosphate to form the second solution may include combining NaF and NH$_4$H$_2$PO$_4$ to form the second solution.

For example, the positive electrode may include an iron-doped Na$_3$Fe$_{0.3}$V$_{1.7}$O(PO$_4$)$_2$F$_2$ compound formed utilizing a facile hydrothermal route. The positive electrode may be formed from stoichiometric mixtures of NaF, NH$_4$VO$_3$, M(CH$_3$COO)$_3$·xH$_2$O, NH$_4$H$_2$PO$_4$, and C$_6$H$_8$O$_7$ (citric acid). Citric acid may be utilized as a carbon source and reducing agent. First, NH$_4$VO$_3$ and citric acid may be combined at a mole ratio of from 10:1 to 1:10, optionally from 5:1 to 1:5, or optionally 1:2 in a predetermined amount of water (e.g. 40 ml) to form Solution A. M(CH$_3$COO)$_3$·xH$_2$O may be added to Solution A to form Solution B. The NaF and NH$_4$H$_2$PO$_4$ may be combined in a predetermined amount of water (e.g. 40 ml) to form Solution C. Solution C may then added dropwise to the Solution B under continuous stirring to form Solution D. Solution D is then heated (e.g. at 200° C.) for a predetermined amount of time (e.g. 20 hours). After filtering Solution D, the resulting powder may be dried (e.g. at 100° C.) for a predetermined amount of time (e.g. 12 hours) under vacuum. It is to be appreciated that other temperatures and lengths of time may be utilized.

In other embodiments, routes other than a hydrothermal synthesis route may be utilized. For example, a solid state synthesis route may include combining Solution B and Solution C to form Solution D, and then drying Solution D (e.g. at 100° C.). The resulting powder may then be calcined at a high temperature, such as about 650° C., under argon. As another example, a sol gel-assisted refluxing route may include combining Solution B and Solution C to form Solution D, and then refluxing (e.g. at 120° C.) for a predetermined amount of time (e.g. 24 hours). The resulting solution may then be washed with water and dried (e.g. at 100° C.) for a predetermined amount of time (e.g. 1 hour). It is to be appreciated that other temperatures and lengths of time may be utilized.

As introduced above, a battery is also provided. The battery may comprise a coin cell (e.g. CR2032), a pouch cell, a cylindrical cell, or a combination thereof. A plurality of batteries may be arranged to form a battery pack. The battery may have a capacity in an amount of from about 1 mAh to about 100 Ah, optionally from about 10 mAh to about 10 Ah, or optionally from about 50 mAh to about 5 Ah.

The battery includes the positive electrode described above and a negative electrode. The negative electrode may include an anode active material. The anode active material may comprise a metal/metalloid alloyable with sodium, or an alloy or an oxide thereof. For example, the metal/metalloid alloyable with lithium may comprise Ti, Si, Mg, Ca, Sr, Ba, Ra, Sc, Y, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or combinations thereof. In various embodiments, the negative electrode includes a sodium-containing compound, a hard carbon, antimony (Sb), Sb@C and LTO, or a combination thereof. In some embodiments, the hard carbon includes multi-walled carbon nanotubes.

In certain embodiments, the sodium-containing compound includes sodium phosphate. In these and other embodiments, the sodium phosphate has a formula according to Formula IV:

$$\text{NaTi}_2(\text{PO}_4)_3 \qquad \text{IV.}$$

In one exemplary embodiment, the negative electrode comprises a NaTi$_2$(PO$_4$)$_3$—multi-walled carbon nanotubes (MWCNT).

In various embodiments, the battery further includes an electrolyte in contact with the negative electrode and the positive electrode. In certain embodiments, the electrolyte includes a sodium salt-containing non-aqueous electrolyte. In these and other embodiments, the electrolyte may be a salt selected from the group of NaPF$_6$, NaClO$_4$, NaBF$_4$, and combinations thereof. However, it is to be appreciated the electrolyte may include or be any sodium-containing compound.

The electrolyte may further include an electrolyte additive selected from the group of fluorinated carbonates, anhydrides, sulfones, sulfites, and combinations thereof. Non-limiting examples of suitable electrolyte additives includes fluoroethylene carbonate (FEC), trans-difluoroethylene carbonate (DFEC), ethylene sulfite (ES),1,3-propane sultone (PS), and glutaric anhydride (GA).

In other embodiments, the non-aqueous electrolyte may comprise an organic solvent. The organic solvent may be any organic solvent commonly used in the art. For example, the organic solvent may include propylenecarbonate, ethylene carbonate, fluoroethylenecarbonate, butylenecarbonate, di-methylcarbonate, diethylcarbonate, ethyl methyl carbonate, methyl propylcarbonate, ethyl propylcarbonate, methyl isopropylcarbonate, dipropylcarbonate, dibutylcarbonate, fluoroethylenecarbonate, benzonitrile, acetonitrile, tetrahydrofuran, 2-methyltetrahydrofuran, γ-butyrolactone, dioxorane, 4-methyldioxorane, N,N-dimethylformamide, N,N-dimethylacetamide, dimethylsulfoxide, dioxane, 1,2-dimethoxyethane, sulforane, dichloroethane, chlorobenzene, nitrobenzene, diethyleneglycol, dimethylether, or combinations thereof. In certain embodiments, the electrolyte may be in the presence of a solvent selected from the group of ethylene carbonate (EC), propylene carbonate (PC), dimethyl carbonate (DMC), diethyl carbonate (DEC), and combinations thereof.

A separator may be disposed between the positive electrode and the negative electrode. The separator may include an insulating thin film having high ion permeability and high mechanical strength. The separator may have a pore diameter in an amount of from about 0.01 to about 10 µm, and a thickness in an amount of from about 5 to about 20 µm. Non-limiting examples of suitable materials for the insulating film include olefin-based polymer, such as polyethylene, polypropylene, polyvinylidene fluoride, or a multilayer film of two or more thereof. Other non-limiting examples include a mixed multilayer film, such as a polyethylene/polypropylene double-layered separator, a polyethylene/polypropylene/polyethylene triple-layered separator, or a polypropylene/polyethylene/polypropylene triple-layered separator. The film may be in the form of a sheet or a nonwoven fabric. In embodiments when a solid polymeric electrolyte is used as an electrolyte, the solid polymeric electrolyte may also serve as a separator.

EXAMPLES

Exemplary Positive Cathode Preparation

The $Na_3Fe_{0.3}V_{1.7}O(PO_4)_2F_2$ material for the exemplary positive electrode was successfully prepared using a single step via a hydrothermal route without employing any heat treatments according to conventional procedures. Stoichiometric mixtures of $NH_4VO_3$ (Aldrich, ≥99.99%), acetic acid $CH_3COOH$ (Aldrich, ≥99.99%), NaF (Aldrich, ≥99%), $Fe(NO_3)_3 \cdot 9H_2O$ (Aldrich, ≥99%), and $NH_4H_2PO_4$ (Aldrich, 99.99%) were used in the synthesis. First, $NH_4VO_3$ and acetic acid $CH_3COOH$ with a mole ratio of 1:1 were dissolved in 20 ml of $H_2O$ to form a clear green solution (Solution A). $Fe(NO_3)_3 \cdot 9H_2O$ was added into Solution A to form Solution B, and then was stirred at 70° C. for 30 min. NaF and $NH_4H_2PO_4$ were then dissolved in 10 ml of $H_2O$ to form Solution C. After stirring at 70° C. for 30 min, Solution C was added to Solution B dropwise to form Solution D, which was stirred at 70° C. for an additional 1 h. Solution D was finally poured in a 100 mL autoclave which was then heated at 200° C. for 24 h. After filtering the solution, the obtained green powder was dried at 100° C. for 12 h under vacuum.

Test Method 1: Powder X-Ray Diffraction and Scanning Electron Microscopy Measurements Powder XRD measurements were performed to identify the phase purity of the synthesized materials in the Bragg-Brentano reflection geometry between 10° and 80° (2θ value) using a Bruker D8 diffractometer equipped with a 1.6 kW sealed x-ray tube source (Cu-Kα radiation) and a Vantec2000 2D detector. Full pattern matching and refinement was performed with the Jana2006 program package. The particle size and morphology were characterized using a field-emission scanning electron microscope (FEI, Quanta 650). A transmission electron microscope (Talos F200X, FEI) with a 200 kV operating voltage was used to capture the morphology, energy-dispersive x-ray spectroscopy (EDX) spectrum and selected area electron diffraction patterns of the $Na_3Fe_{0.3}V_{1.7}O(PO_4)_2F_2$ composite. The particle morphology was also investigated by field-emission SEM (Nova).

Test Method 2: Mössbauer Spectroscopy

A constant-acceleration spectrometer recorded $^{57}Fe$ transmission Mössbauer spectroscopy data with a $^{57}Co(Rh)$ source at room temperature. The Mössbauer spectral absorber was prepared with 40 mg/cm$^2$ of materials mixed with boron nitride. The spectrometer was calibrated at room temperature with the magnetically split sextet spectrum of a high-purity α-Fe foil as the reference absorber. The measurements were carried out in the ±4 mm/s velocity ranges. Fitting the experimental data, the spectral parameters such as isomer shift (δ), quadrupole splitting (Δ), linewidth (Γ), and relative resonance areas of the Mössbauer spectrum components were determined. The validity of fits was judged based on minimizing the number of parameters and $\chi^2$ values.

Test Method 3: Electrochemical Cycling

Positive electrodes were made from mixtures containing 80 wt. % active materials, 10 wt. % acetylene black and 10 wt. % polyvinylidene difluoride in N-methyl-2-pyrrolidone as a solvent. The electrodes were prepared by casting the slurry onto aluminum foil with a doctor blade and drying in a vacuum oven at 110° C. overnight under vacuum. The resulting electrode film was pressed with a twin roller, cut into a round plate (Φ=14.5 mm), and dried at 120° C. for 12 h under vacuum. All the electrochemical performances were carried out using coin-type cells with Whatman fiber glass separators, which were assembled in an argon-filled glove box. The electrochemical properties were evaluated by galvanostatic techniques in the voltage window of 2.8~4.5 V (vs. Na/Na+) at room temperature and 45° C. and in various electrolytes such as EC/PC (1/1), EC/PC/DMC (2:5:3), and EC/DEC (1:1).

Test Method 4: Galvanostatic Intermittent Titration Technique

The charging/discharging current equivalent to C/20 rate was applied using a Solartron battery cycler (1470E). The current was applied for 2 h to form a certain SOC/state of discharge (SOD) followed by a 3-h rest to reach the steady-state cell voltage, and the procedure was repeated stepwise to cover all SOCs/SODs and repeated for at least two charge/discharge cycles. During this titration, a sodium concentration gradient is developed across the active particles. Therefore, a cell voltage polarization occurs followed by a relaxation of the cell voltage (depolarization) at the open-circuit voltage (OCV) condition, which develops with time. The ionic diffusivity was then calculated via the obtained relaxation time as the derivative of the cell voltage depolarization vs. time. The diffusion length was determined based on the particle diameter.

Ionic diffusivity was also measured as a function of temperature at fixed sodium concentration ($Na_3Fe_{0.3}V_{1.7}O(PO_4)_2F_2$). From this sodium content state, the cell was charged for 2 h and relaxed for 3 h as in the procedure mentioned and again discharged for 2 h back to the same composition ($Na_3Fe_{0.3}V_{1.7}O(PO_4)_2F_2$). The measurement was repeated for temperatures from 0 to 50° C. in every 10° C. intervals. The EIS measurements were also performed at each temperature after relaxing the cell for 3 h at the OCV conditions.

Test Method 5: Impedance Spectroscopy Measurements

After partial desodiation/sodiation, the cell was kept at the OCV conditions to depolarize the cell voltage and to reach the steady state in which voltage decay is less than 2 mV/h at the end of the time interval. Thereafter, EIS measurements were performed in the frequency range between 2 and 5 m Hz using a sinusoidal voltage amplitude of 10 mV. The obtained EIS spectra were fitted using an equivalent circuit model built using Z-View software. Numerical values were extracted from the EIS data using a complex nonlinear least-squares regression analysis.

Test Method 6: Electrochemical Isothermal Calorimetry Measurement

The isothermal calorimetry system (TAM IV micro-calorimeter system, TA Instruments) coupled with an external Arbin Instrument battery cycler (model BT-2000) was used to measure the heat generation of the $Na/Na_3Fe_{0.3}V_{1.7}O(PO_4)_2F_2$ coin-type half-cells during charge/discharge processes at 25 and 45° C. The cell was fitted in the sample holder at the specimen side of the calorimeter and connected to the battery cycler through two pairs of wires for charge and discharge. It was isolated adiabatically from the surroundings. The heat generation output was the differential value between the sample and the inert reference. To examine the effect of charge/discharge rate on heat generation, the cells were cycled between a 2 and 4.5 V cutoff voltage at three different rates (0.1C, 0.2C, and 1.0C) for 25° C. and at 0.2 and 1.0C for 45° C. Measurements were performed three times at each temperature and cycling rate to assess the reproducibility.

Example 1: Characterization of the Positive Electrode, and Battery Including the Same The $Na_3Fe_{0.3}V_{1.7}O(PO_4)_2F_2$ synthesized cathode material was first analyzed using powder XRD. The diffractogram of the material recorded in the 2-theta range of 10° to 70° is illustrated in FIG. 1A. The XRD pattern confirms the high purity of the synthesized $Na_3Fe_{0.3}V_{1.7}O(PO_4)_2F_2$ material without the presence of any crystalline impurities. All peaks are sharp and well-defined, confirming the high degree of crystallinity of $Na_3Fe_{0.3}V_{1.7}O(PO_4)_2F_2$. The chemical composition of $Na_3Fe_{0.3}V_{1.7}O(PO_4)_2F_2$ was qualitatively confirmed by EDX. Full pattern matching and refinement indicated that the material had an orthorhombic crystal structure with the space group Amam similar to $Na_3V_2O(PO_4)_2F_2$ as reported in the literature. The calculated lattice parameters were a=9.041(1) Å, b=9.039(1) Å, and c=10.631(1) Å, resulting in a total cell volume of V=867.32(2) Å³. By comparing the synthesized material with the $Na_3V_2O_x(PO_4)_2F_{3-x}$ crystalline structure reported in the literature (Table 1), the preservation of the structure was observed even with iron substitution. This result confirms that iron was successfully inserted in the $Na_3V_2(PO_4)_2F_3$ structure by a partial substitution of the vanadium.

TABLE 1

Comparison of lattice parameters with $Na_3V_2(PO_4)_2F_{3-x}O_x$ as reported in literature

| Sample | Crystallographic parameters | | | |
|---|---|---|---|---|
| | a | b | c | Type |
| $Na_3V_2(PO_4)_2F_3$ | 9.09394 | 9.09394 | 10.7534 | Comparative |
| $Na_3V_2O(PO_4)_2F_2$ | 9.0353(1) | 9.0375(1) | 10.6863(1) | Comparative |
| $Na_3(VO)_{1.7}Fe_{0.3}(PO_4)_2F_{1.3}$ | 9.0311(4) | 9.0356 | 10.6301(8) | Comparative |
| $Na_3V_{1.2}Fe_{0.8}O_{1.6}(PO_4)_2F_{1.4}$ | 6.38666(9) | 6.3866(9) | 10.6562(2) | Comparative |
| $Na_3Fe_{0.3}V_{1.7}O(PO_4)_2F_2$ | 9.04058 (1) | 9.038395 (1) | 10.63062 (1) | Exemplary |

Microstructural evaluation of the cathode powder was performed using SEM, which indicated platelet morphology with dense and a sub-micron cube-like particle shape for primary particles with a smooth surface and sizes in the range of 3 to 10 mm forming secondary aggregates. Overall, the crystallographic and morphological assessments indicate a high and impurity-free phase without any significant morphological inhomogeneities.

Figure 2:
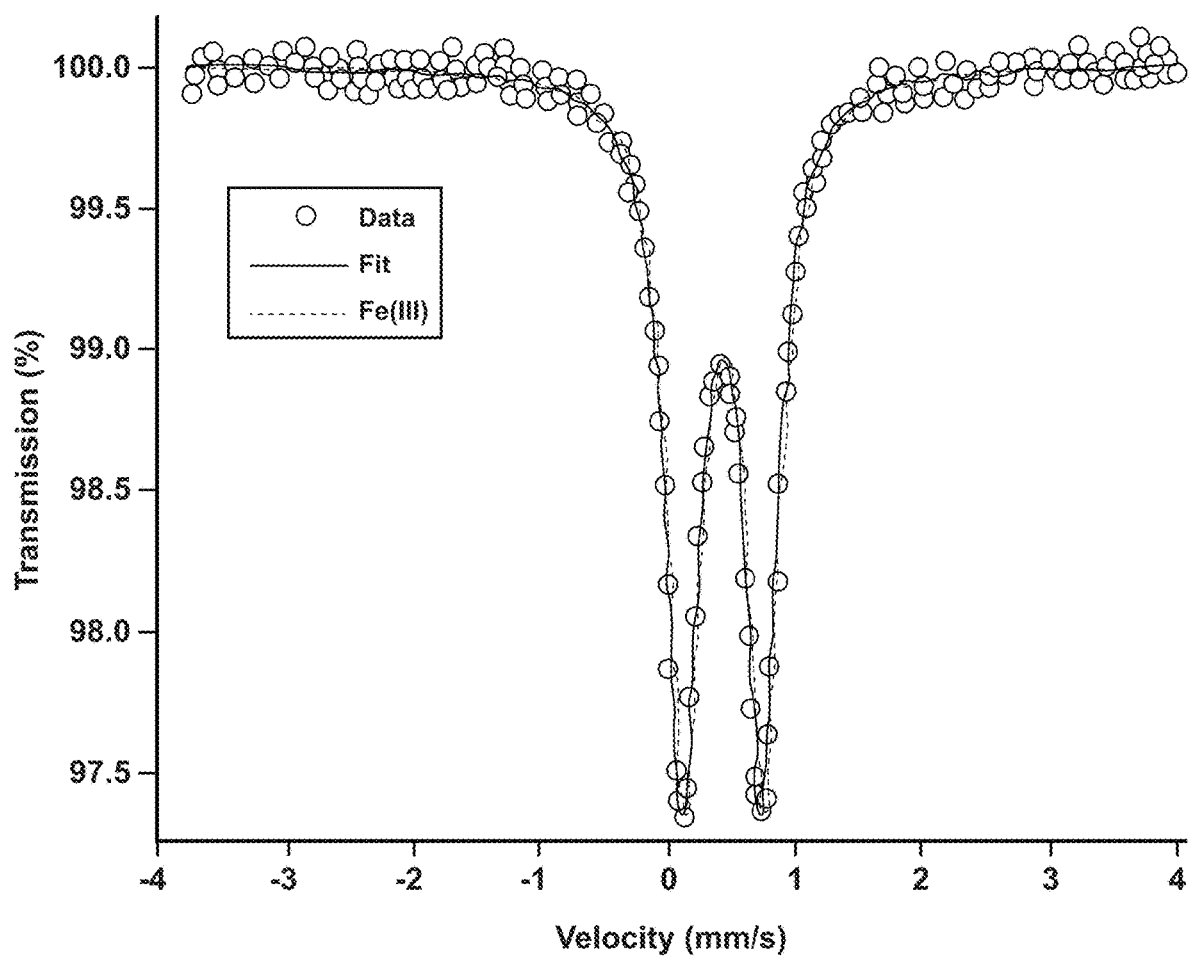
FIG. 2 is a Mössbauer spectrum recorded at room temperature of the $Na_3Fe_{0.3}V_{1.7}O(PO_4)_2F_2$ material prepared by the hydrothermal method.

Because iron was used as the dopant for the vanadium sites, Mössbauer spectroscopy was employed as an excellent technique to assess the oxidation state and local bonding environment of iron in the $Na_3Fe_{0.3}V_{1.7}O(PO_4)_2F_2$ structure. The room temperature $^{57}$Fe Mössbauer spectrum of the $Na_3Fe_{0.3}V_{1.7}O(PO_4)_2F_2$ material prepared by the hydrothermal method is shown in FIG. 2 and the corresponding hyperfine parameters are presented in Table 2.

TABLE 2

Hyperfine parameters of the room temperature Mössbauer spectra $Na_3Fe_{0.3}V_{1.7}O(PO_4)_2F_2$ material.

| Iron sites δ (mm s$^{-1}$) | Iron sites δ (mm s$^{-1}$) | Iron sites δ (mm s$^{-1}$) | Iron sites δ (mm s$^{-1}$) |
|---|---|---|---|

The Mössbauer spectrum recorded at room temperature consisted of a symmetric doublet. The spectrum did not exhibit any magnetic splitting, which confirms the paramagnetic behavior of the $Na_3Fe_{0.3}V_{1.7}O(PO_4)_2F_2$ at room temperature and is consistent with the reported Mössbauer results in the literature for phosphate-based materials. This behavior also indicates that no magnetic iron-based impurities such as hematite $\alpha$-$Fe_2O_3$ or magnetite $Fe_3O_4$ were present, which is in good agreement with the XRD results.

The symmetric spectrum indicated one iron site in the $Na_3Fe_{0.3}V_{1.7}O(PO_4)_2F_2$ structure similar to the $Na_3V_{1.2}Fe_{0.8}O_{1.6}(PO_4)_2F_{1.4}$ as reported in the literature. A good quality fit of the Mössbauer spectrum of $Na_3Fe_{0.3}V_{1.7}O(PO_4)_2F_2$ was obtained by using only one doublet attributed to $Fe^{3+}$ component. The obtained values of the isomer shift (0.32 mm·s$^{-1}$) and quadrupole splitting (0.42 mm·s$^{-1}$) were consistent with the high spin state of $Fe^{3+}$ in $FeO_6$-type octahedral sites. This result also confirms that iron was doped in the $Na_3V_2(PO_4)_2F_3$ structure.

Figure 3A:
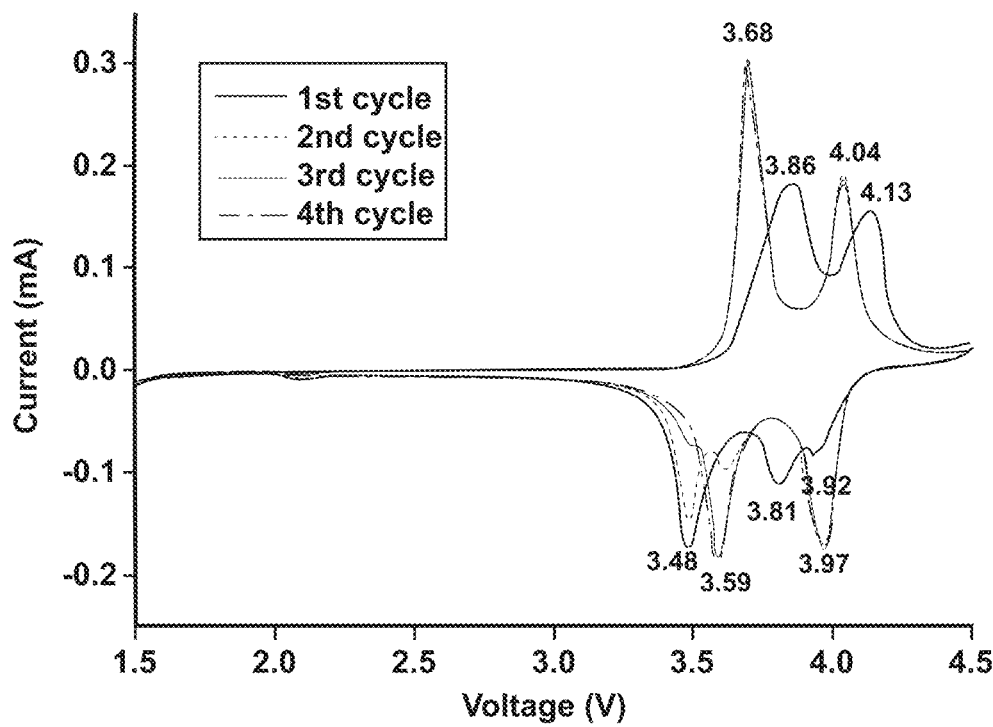
FIG. 3A is a cyclic voltammograms showing the initial conditioning cycles of the synthesized Na3Fe0.3V1.7O(PO4)2F2 cathode.
Figure 3B:
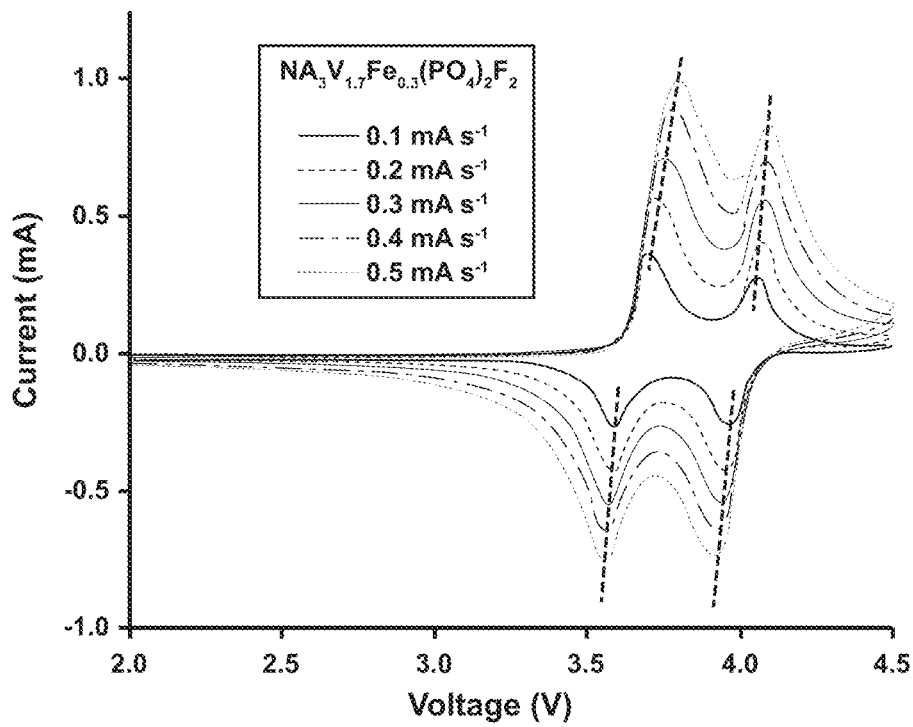
FIG. 3B is a cyclic voltammograms at various scan rates from 0.1 to 0.5 mV/s of the synthesized Na3Fe0.3V1.7O(PO4)2F2 cathode.
Figure 3C:
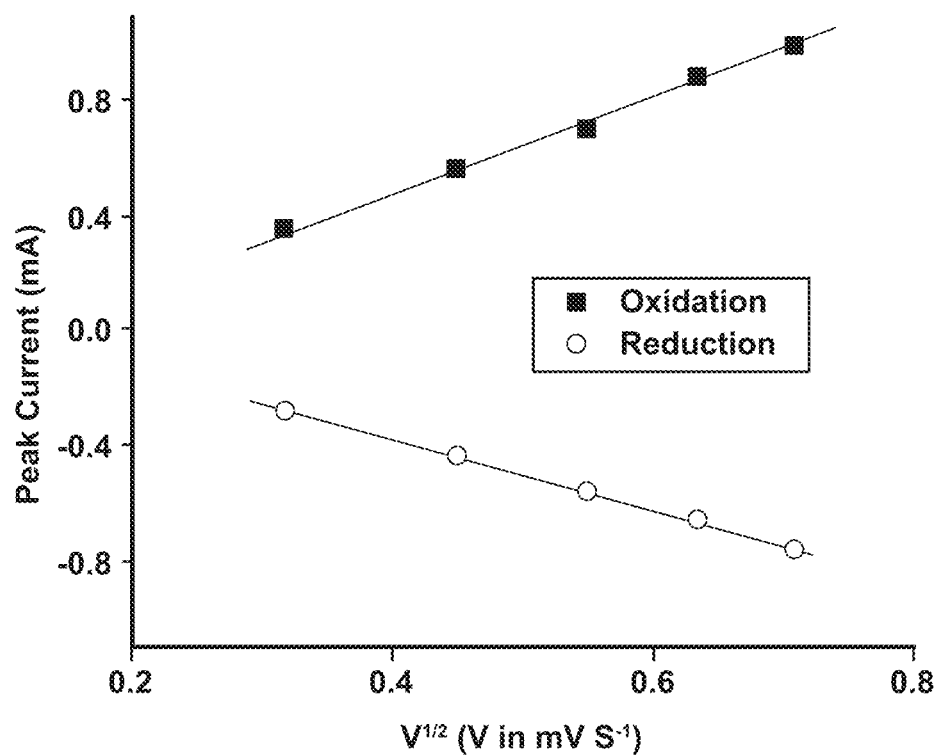
FIG. 3C shows peak currents with increasing scan rates for the redox couple $V^{3+}/V^{4+}$ of the synthesized Na3Fe0.3V1.7O(PO4)2F2 cathode.
Figure 3D:
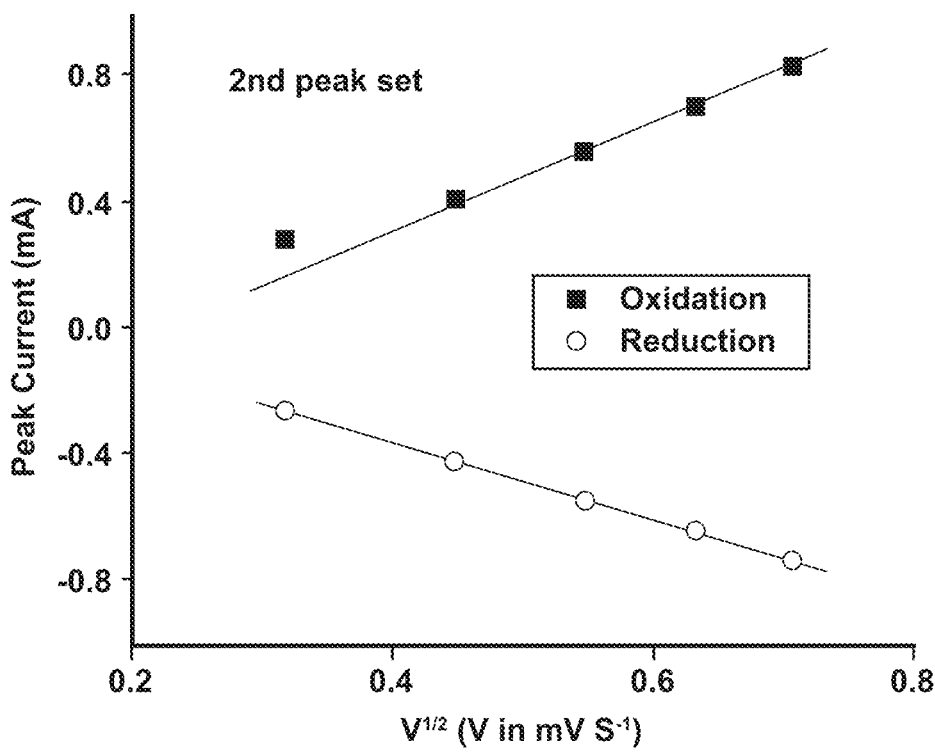
FIG. 3D peak currents with increasing scan rates for the redox couple $V^{4+}/V^{5+}$ of the synthesized Na3Fe0.3V1.7O (PO4)2F2 cathode.

The electrochemical behavior of the vanadium redox couple in the $Na_3Fe_{0.3}V_{1.7}O(PO_4)_2F_2$ cathode material was first investigated using cyclic voltammetry (CV). At different scan rates, FIGS. 3A-3B illustrate the CV curves of $Na_3Fe_{0.3}V_{1.7}O(PO_4)_2F_2$, which exhibits two active redox couples in the 1.5-4.5 V voltage window. The first redox couple with anodic and cathodic peaks centered at around 3.7 and 3.6 V, respectively, corresponded to the $V^{3+}/V^{4+}$ redox couple and are attributed to the reversible extraction and insertion of one sodium atom into the crystal structure of $Na_3Fe_{0.3}V_{1.7}O(PO_4)_2F_2$. The second redox couple with anodic and cathodic peaks at 4.0 and 3.9 V, respectively, corresponded to the vanadium redox and the reversible extraction and insertion of a second sodium atom.

These two redox couples enabled extraction/insertion of two sodium atoms associated with $V^{3+}/V^{4+}$ and $V^{4+}/V^{5+}$ consistent with those reported for $Na_3(VO)_{1.7}Fe_{0.3}(PO_4)_2F_{1.3}$, $Na_3V_2O_{1.6}(PO_4)^2F_{1.4}$, and $Na_3(VO_{0.5})_2(PO_4)_2F_2$ cathode materials as reported in the literature. Additionally, $Na_3Fe_{0.3}V_{1.7}O(PO_4)_2F_2$ material operates at the average voltage of ~3.85 V, which is higher than those reported for conventional $NaFe_2(SO_4)_2(PO_4)$ (2.8 V), $Na_{1.86}Fe_3(PO_4)_3$, and $Na_4MnV(PO_4)_3$ sodium cathodes. After four conditioning cycles, CV tests were performed at different scan rates from 0.1 to 0.5 mV s$^{-1}$ in a potential range of 2.0 to 4.5 V. As the scan rate increased, the height and area of the CV curves increased because of the constant capacity of the electrode, which indicates that no side reactions occurred and a single-phase process occurred during the sodium insertion and extraction at different rates during cycling.

Figure 4A:
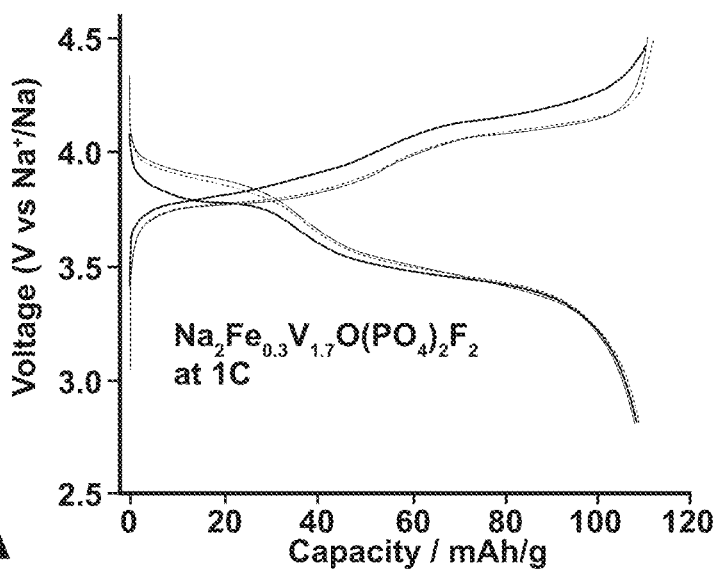
FIG. 4A shows charge/discharge curves for $Na_3Fe_{0.3}V_{1.7}O(PO_4)_2F_2$.
Figure 4B:
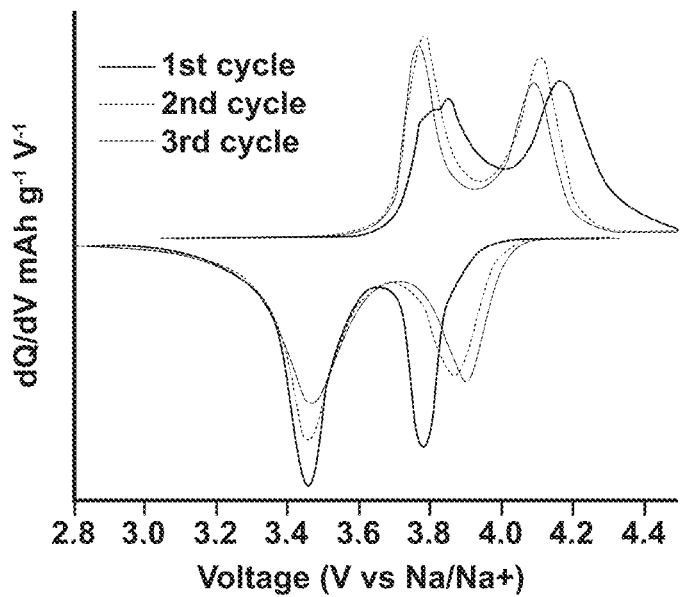
FIG. 4B shows dQ/dV plots for $Na_3Fe_{0.3}V_{1.7}O(PO_4)_2F_2$.
Figure 4C:
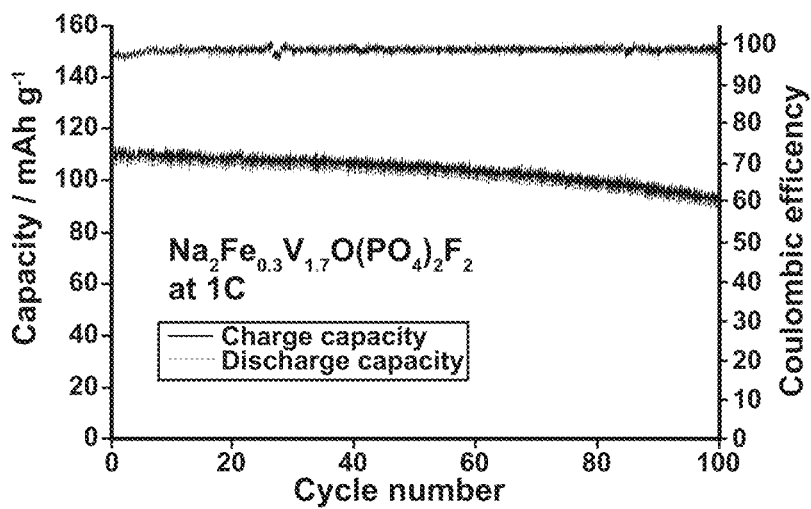
FIG. 4C shows cycling performance and coulombic efficiencies at a 1.0C rate for $Na_3Fe_{0.3}V_{1.7}O(PO_4)_2F_2$.
Figure 5A:
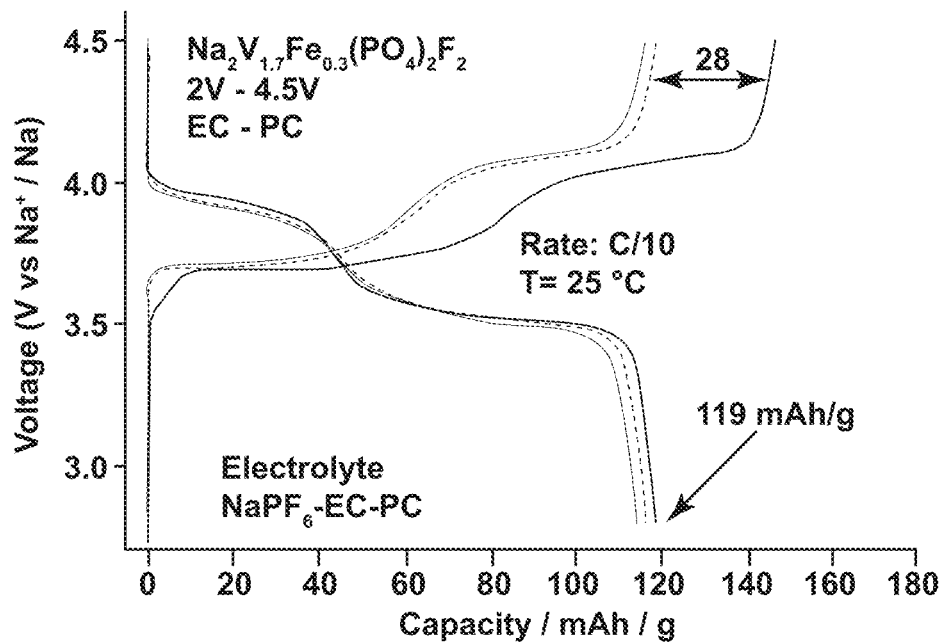
FIGS. 5A-5F show voltage profile curves and cycling performances at different electrolyte formulations with 0.1C rates tested at room temperature.
Figure 5B:
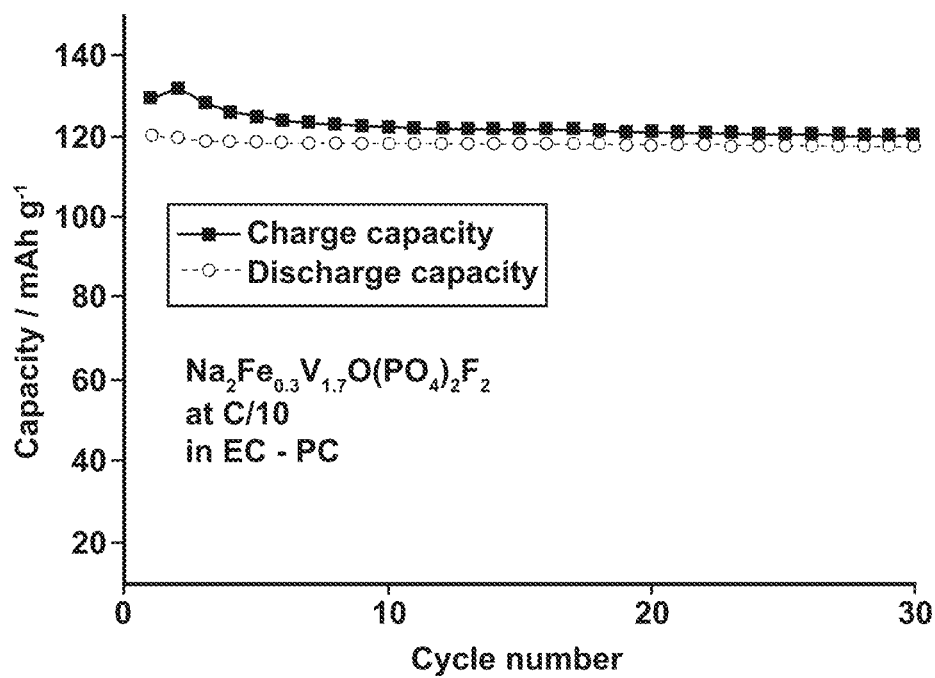
Figure 5C:
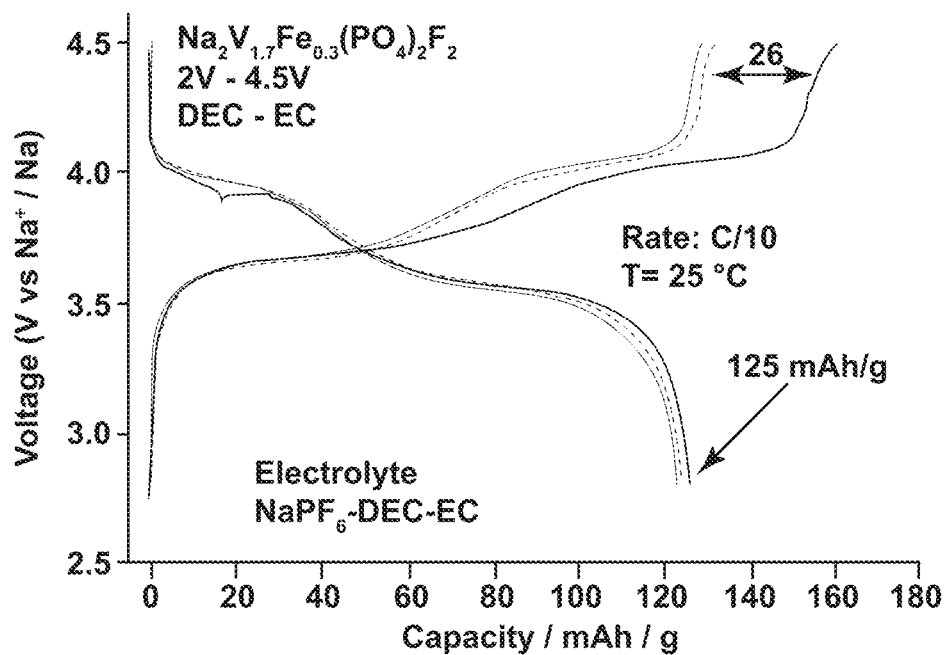
Figure 5D:
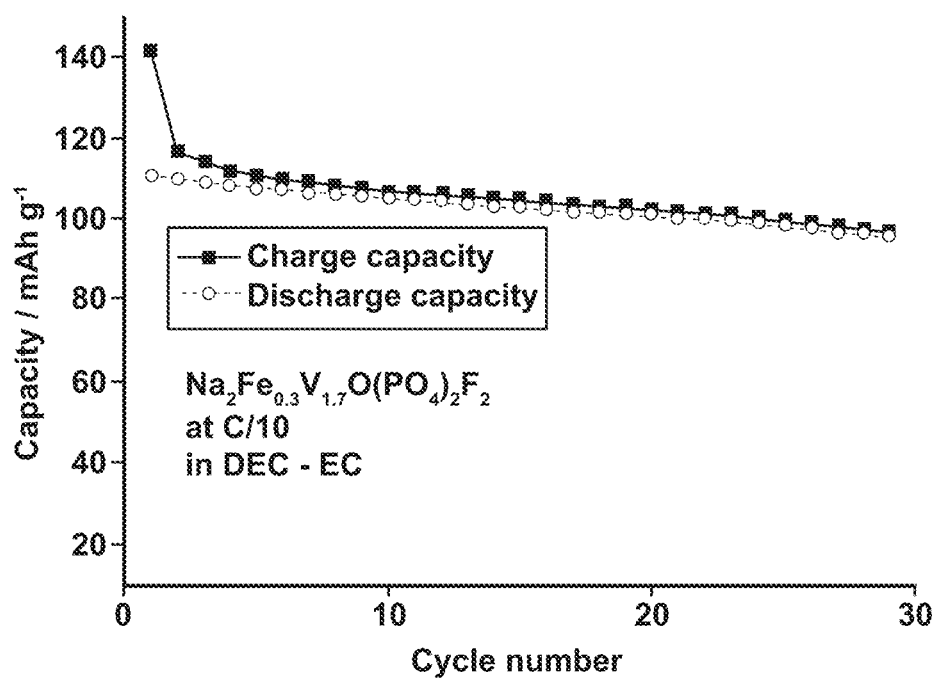
Figure 5E:
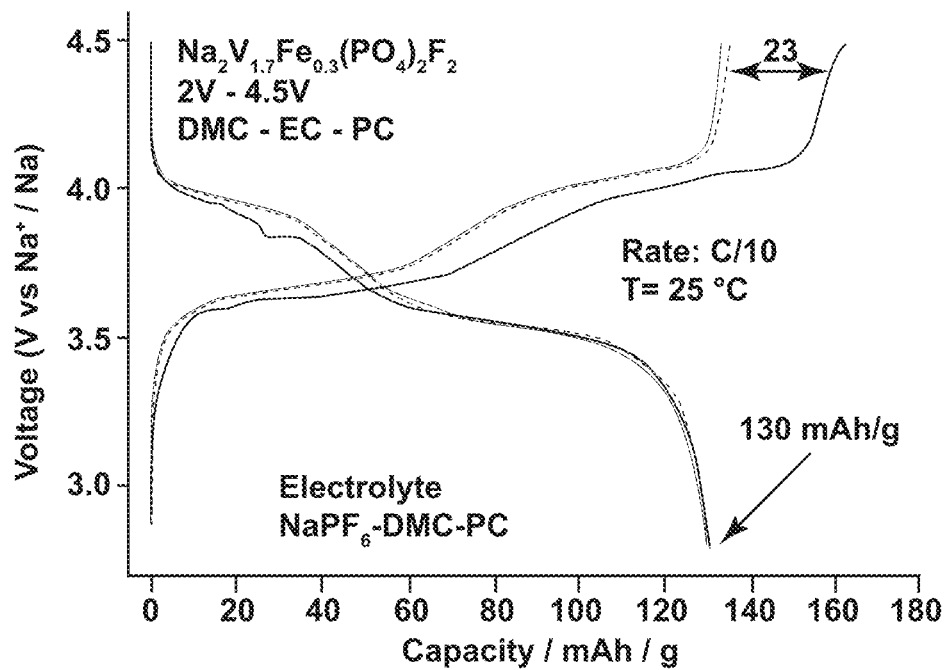
Figure 5F:
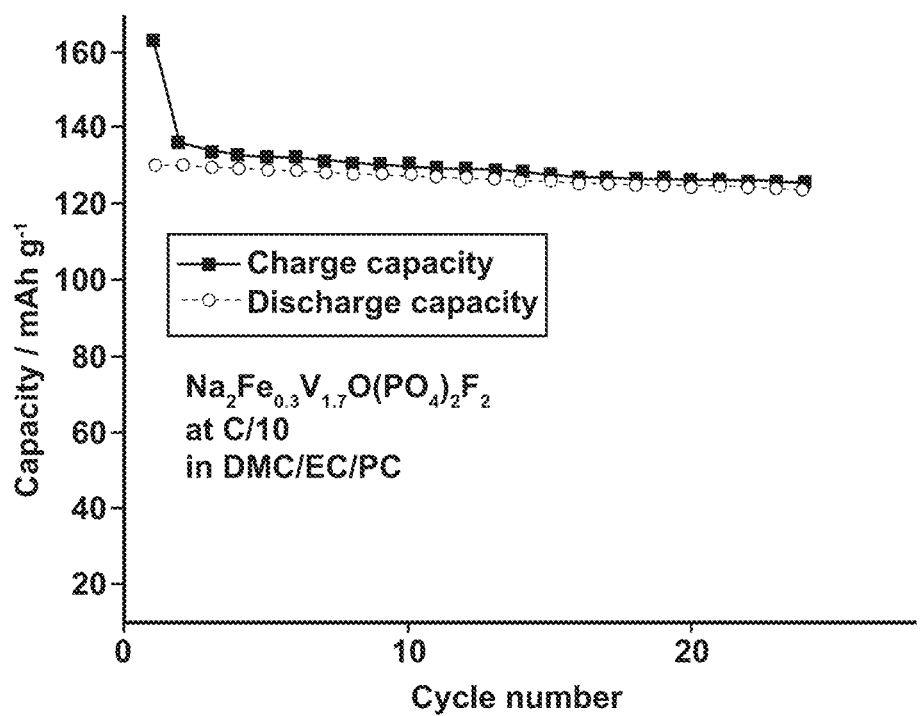

The electrochemical performance of the $Na_3Fe_{0.3}V_{1.7}O(PO_4)_2F_2$ was investigated using the galvanostatic charge/discharge technique. The curve shows that the $Na_3Fe_{0.3}V_{1.7}O(PO_4)_2F_2$/Na half-cell exhibited two potential plateaus at 3.65 V and 4.1 V with good $Na^+$ extraction/insertion processes during cycling. The voltage profiles present the two defined plateaus related to sodium-ion extraction and insertion. The two plateaus observed as shown in the charge/discharge profile and agreed well with the reported charge/discharge behavior of $Na_3V_2O_{1.6}(PO_4)_2F_{1.4}$ and $Na_3(VO_{0.5})_2(PO_4)_2F_2$. Two larger plateaus at 4.02/4.25 and 3.74/3.96 V, respectively, also corresponded to the redox reactions observed by the CV measurements. The Na half-cell shows good cycling performance with a stable discharge capacity of 98 mAh/g after 100 cycles with a capacity retention of about 85% corresponding to high coulombic efficiency of 99.9% (FIG. 4C).

The electrochemical performance of the $Na_3Fe_{0.3}V_{1.7}O(PO_4)_2F_2$/Na half-cell was tested using different electrolyte formulations of DMC-EC-PC, DEC-EC, and EC-PC at C/10. Higher discharge capacity was obtained with the DMC-EC-PC electrolyte compared with DMC-free compositions, DEC-EC and EC-PC (FIGS. 5A-5D), which can be attributed to an improved ionic conductivity and better wettability for DMC-based electrolytes.

Figure 6A:
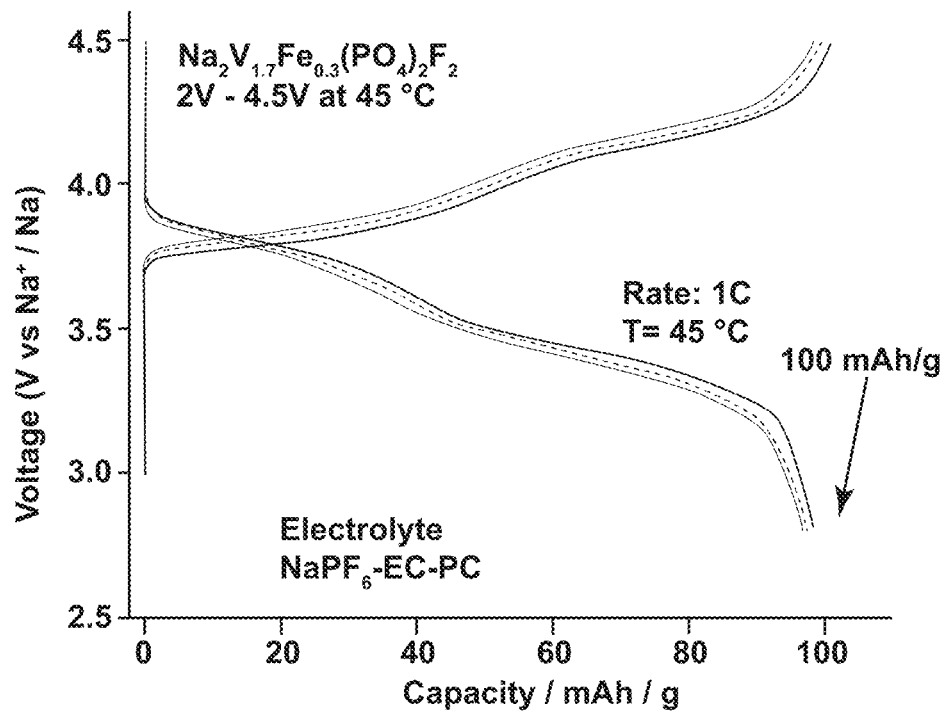
FIGS. 6A-6D show voltage profile curves and cycling performances at different electrolyte formulations with 0.1C rates tested at 45° C.
Figure 6B:
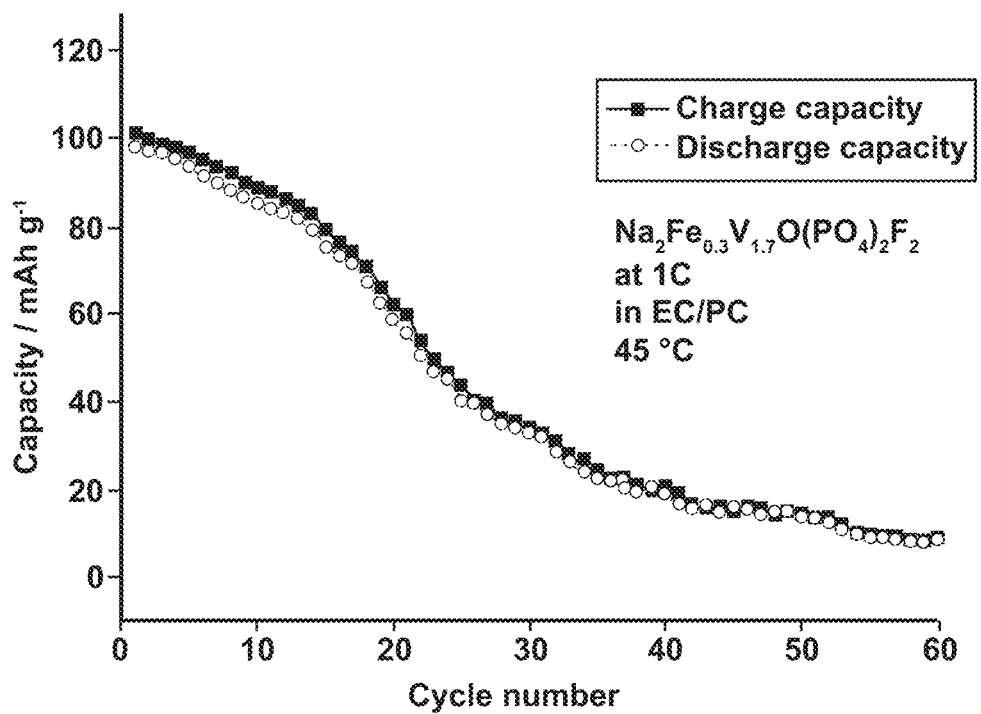
Figure 6C:
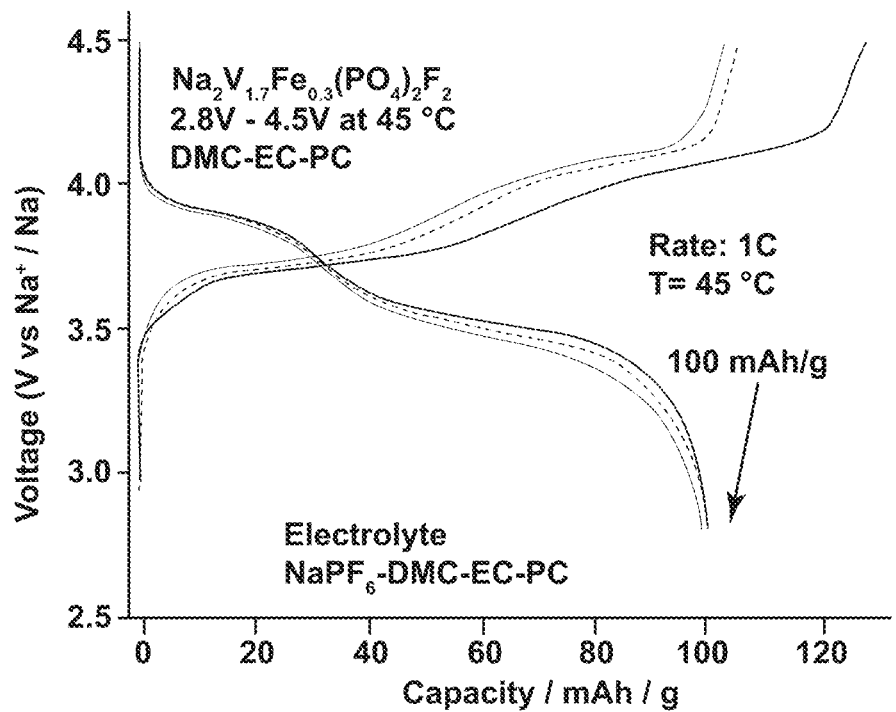
Figure 6D:
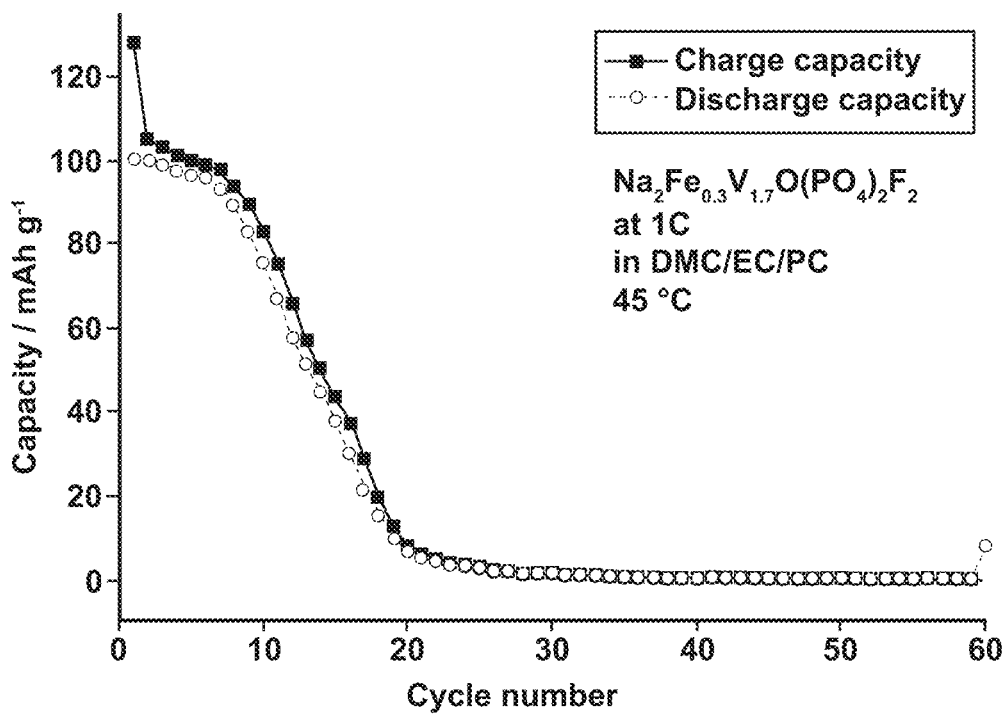
Figure 7A:
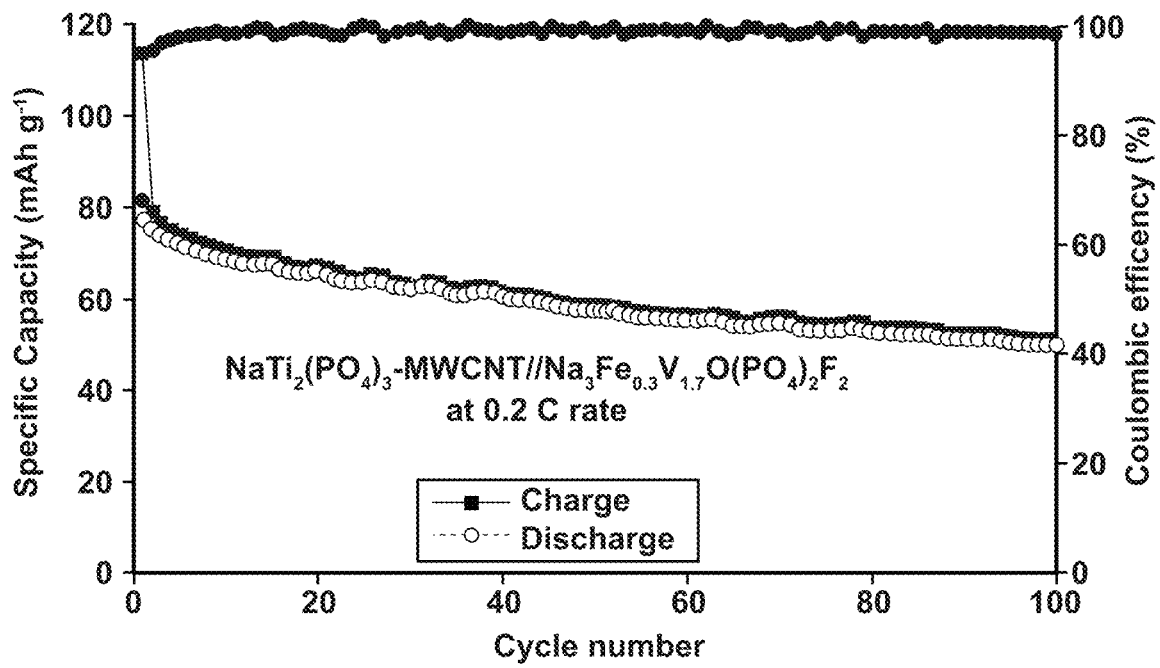
FIGS. 7A and 7B show electrochemical performance of the full cell $NaTi_2(PO_4)_3$MWCNT/$Na_3Fe_{0.3}V_{1.7}O(PO_4)_2F_2$ in 1 M $NaPF_6$ in an EC:DMC-based electrolyte.
Figure 7B:
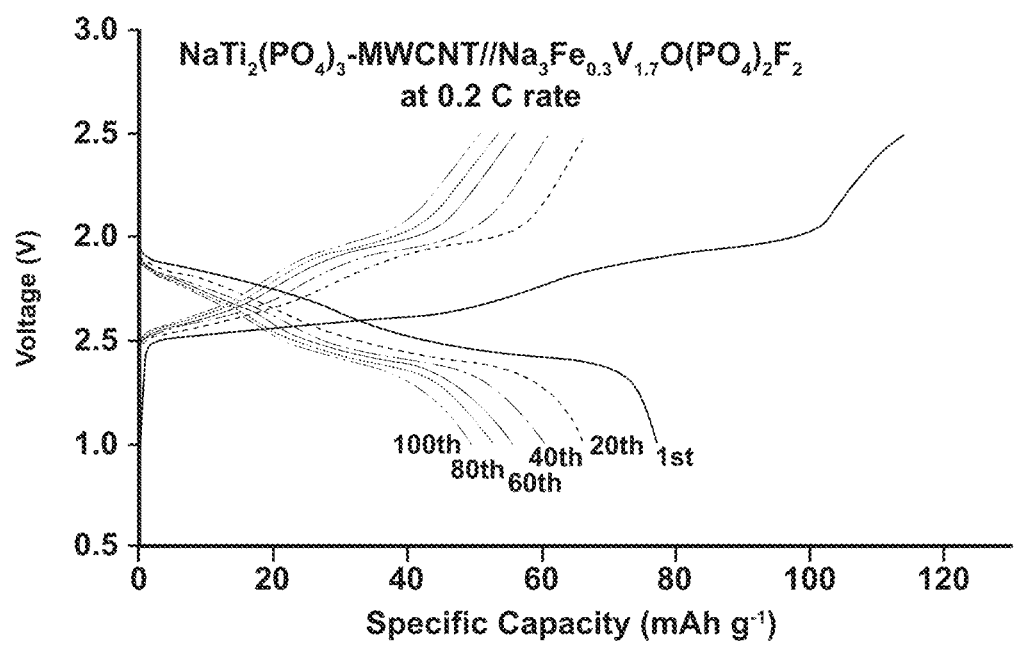

Battery testing at high temperatures is an important criterion for possible commercialization of sodium battery systems. It is also useful in the case of a system deployed in relatively high-temperature conditions (FIG. 7A). Thus, the $Na_3Fe_{0.3}V_{1.7}O(PO_4)_2F_2$/Na half-cell was cycled at 45° C. using different electrolyte formulations DMC-EC-PC and EC-PC at 1.0C. The obtained discharge capacity in the half-cell configuration was ~100 mAh/g for the two different electrolyte formulations. However, high temperatures up to 45° C. may have had a severe effect on the capacity retention, which dropped significantly within 14 cycles (FIGS. 6B and 6D). FIG. 7B shows the performance of the full-cell $NaTi_2(PO4)3MWCNT/Na_3Fe_{0.3}V_{1.7}O(PO_4)_2F_2$ in 1 M NaPF6 in EC:DMC electrolyte cycled between 0.5 to 3.25 V at a 0.2C rate. The full-cell delivered an initial discharge capacity of 80 mAh/g (current density of 24 mA/g) with a moderate coulombic efficiency of 85% (FIG. 7A). The discharge capacity decreased to 50 mAh/g after 100 cycles. FIG. 7B shows the evolution of the charge/discharge voltage profiles for selected cycle numbers. The full-cell $NaTi_2(PO_4)_3$-MWCNT/$Na_3Fe_{0.3}V_{1.7}O(PO_4)_2F_2$ showed an average discharge voltage of around 1.8 V.

Figure 8:
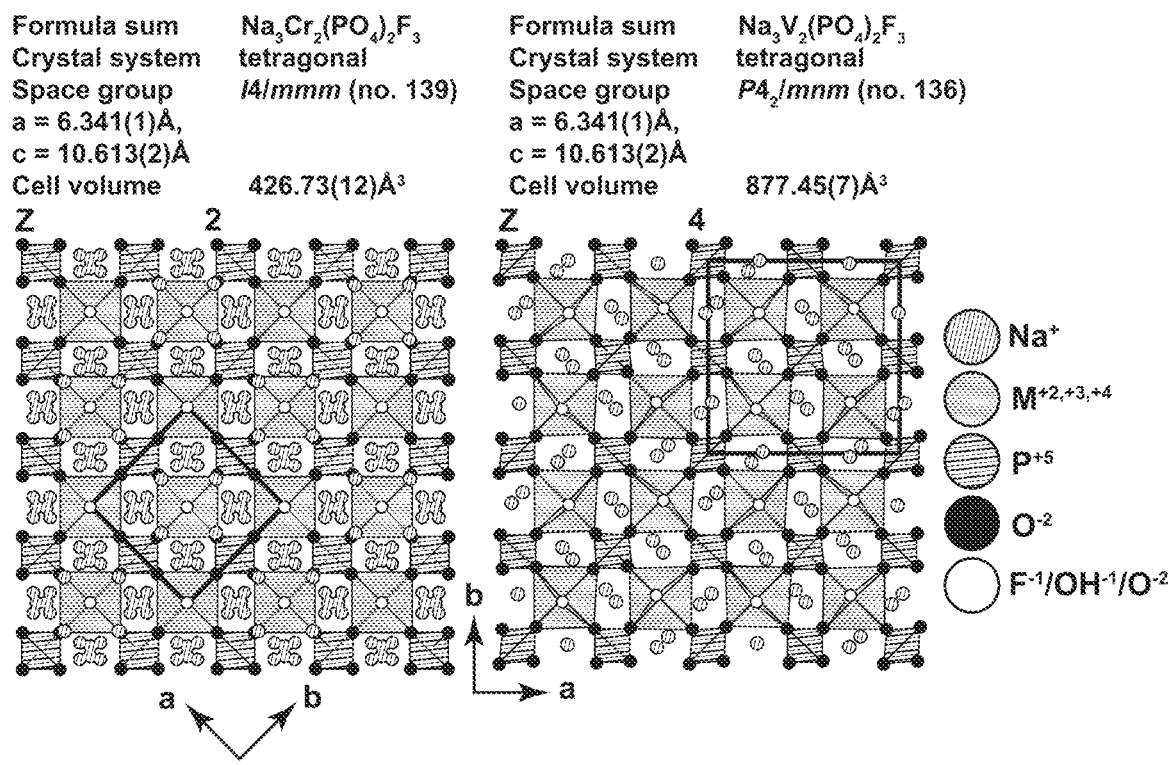
FIG. 8 shows views of the crystal structures of $Na_3Cr_2(PO_4)_2F_3$ (S.G.: I4/mmm) and $Na_3V_2(PO_4)_2F_3$ (S.G.: P42/mnm) along the c axis.

Based on the full pattern matching performed on all the $Na_3V_{2-x}M_xO_y(PO_4)_2F_{3-y}$ samples, the powder patterns could be indexed either using the space group I4/mmm or P4$_2$/mnm. This indicates that the crystal structures of our compounds are either isostructural to $Na_3Cr_2(PO_4)_2F_3$ or $Na_3V_2(PO_4)_2F_3$, respectively (FIG. 8). The main difference between both structures is the distribution of the sodium atoms within the $[V_2(PO_4)_2F_3]^{3-}$ frameworks besides the slight distortion of the octahedra containing the vanadium cations. It is worth to mentioning that all the $Na_3V_{2-x}M_xO_y(PO_4)_2F_{3-y}$, have also very similar $[M_2(PO_4)_2F_3]^{3-}$ frameworks even though they crystallize with different space groups (I4/mmm, P4$_2$/mnm, P4$_2$/mbc, Cmcm, Cmc2$_1$, or Pbam).

Example 2: Interfacial Kinetics and Ionic Diffusivity

Figure 9A:
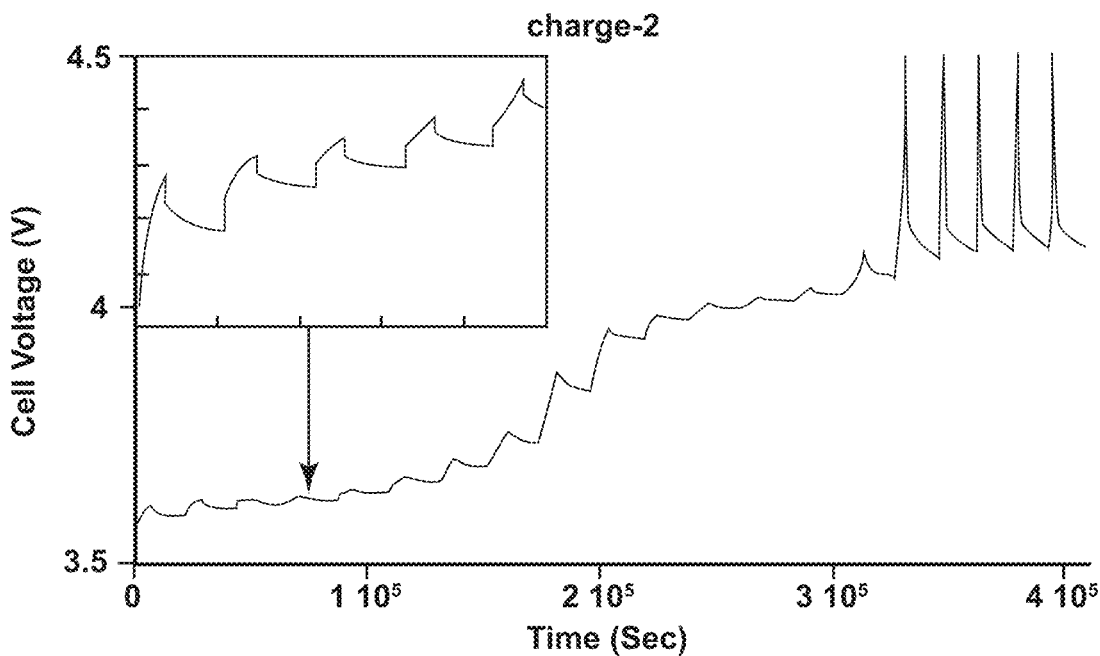
FIGS. 9A-9C show voltage profiles and impedance spectra of $Na_{3-x}Fe_{0.3}V_{1.7}O(PO_4)_2F_2$ cathode material at a half-cell configuration recorded during the first and second charge at different sodium concentrations.
Figure 9B:
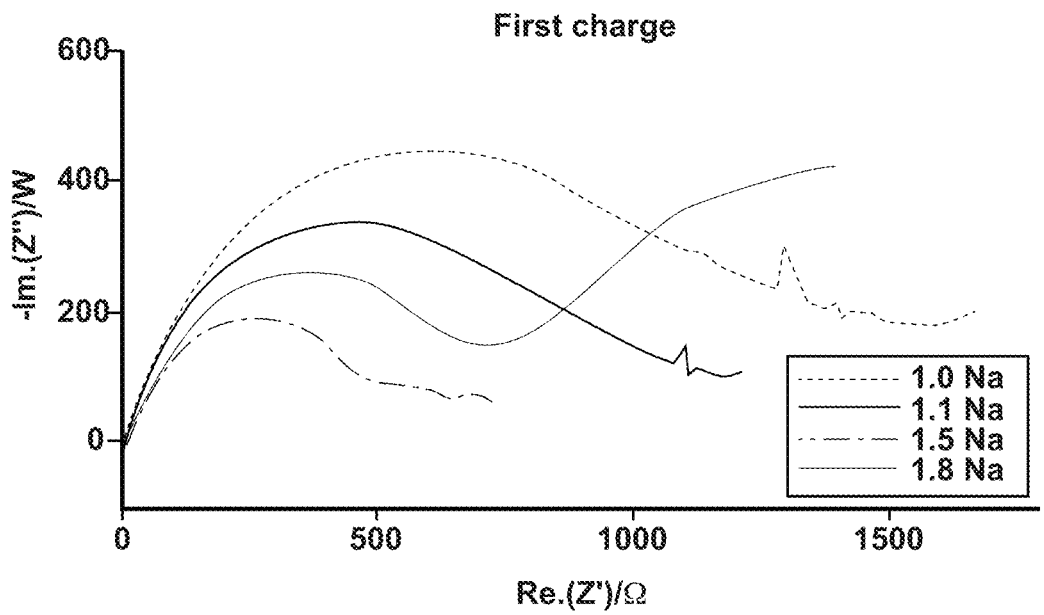
Figure 9C:
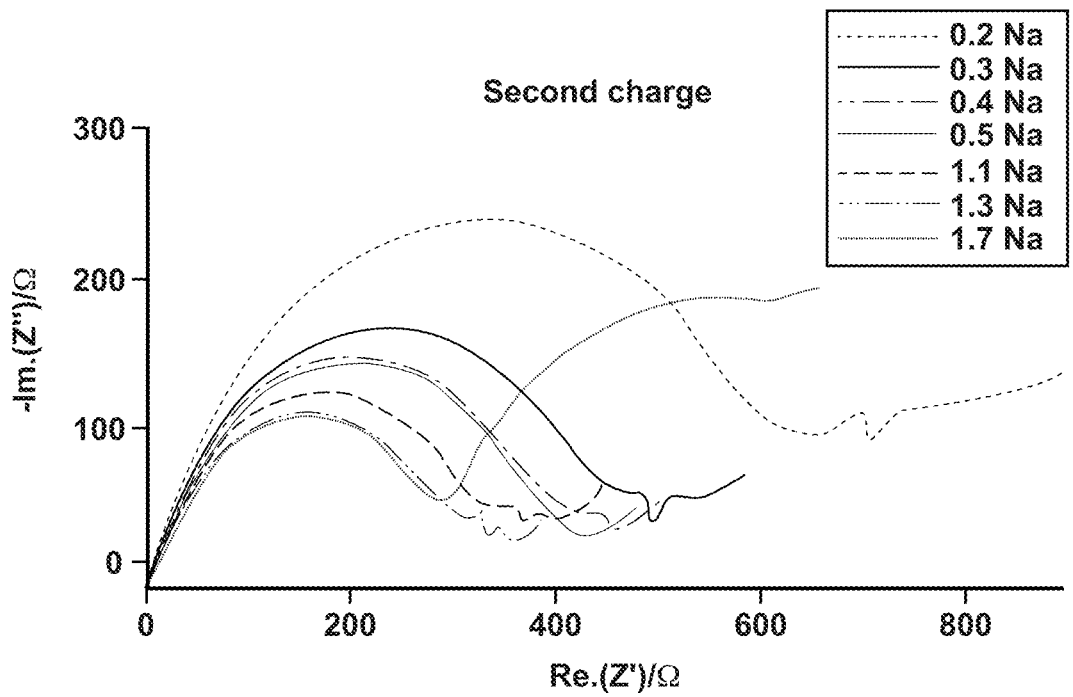

FIG. 9A displays the cell voltage vs. time in the galvanostatic intermittent titration technique (GITT) measurements. At the first cycle, the charging/discharging current equivalent to a C/20 rate was applied using a Solartron battery cycler (1470E). The current was applied for 2 h to form a certain SOC/SOD (followed by a 3-h rest to reach the steady-state cell voltage) and the procedure was repeated stepwise to cover whole SOCs/SODs. The same procedure was applied in the second charge/discharge cycle. EIS measurements were performed at each steady state after voltage relaxation. Impedance spectra of selected sodium content (X values) are displayed in FIGS. 9B and 9C for the first and second cycle, respectively. The shape of the impedance spectra changed from two semicircles in the first cycle to one semicircle (overlapping) in the second cycle. The cell was held at the OCV for 3 h with a voltage decay rate of ~2 mV/h at the end of the partial desodiation. Under the OCV conditions, the cell voltage at a particular SOC was in between the oxidation and reduction states. Notably, small bias potentials during the EIS measurements in such a situation can initiate partial sodium intercalation/deintercalation.

The measured Nyquist plots of $Na_3Fe_{0.3}V_{1.7}O(PO_4)_2F_2$ in the first cycle comprised the following features: (i.) at high frequencies, ohmic contribution caused by the ionic resistance of the electrolyte solution (R1)—along with a minor contribution of the solid electrolyte interphase and inductive effect—appeared below the real axis (L1). Induction was directly proportional to frequency (L∝f); (ii.) the first single semicircle was observed at medium-high frequencies, which was likely due to the charge transfer resistance (R2) at the metallic sodium/electrolyte interface; (iii.) the second single semicircle was observed at medium-low frequencies, which was likely due to the charge transfer resistance (R3) at the $Na_3Fe_{0.3}V_{1.7}O(PO_4)_2F_2$/electrolyte interface; and (iv.) a Warburg response (Ws) appeared at low frequencies.

In the second cycle, the separation of charge transfer resistance at the metallic sodium/electrolyte interface was troublesome because it appeared to overlap with the relaxation process of the cathode interface and appeared to be a single semicircle.

Figure 10:
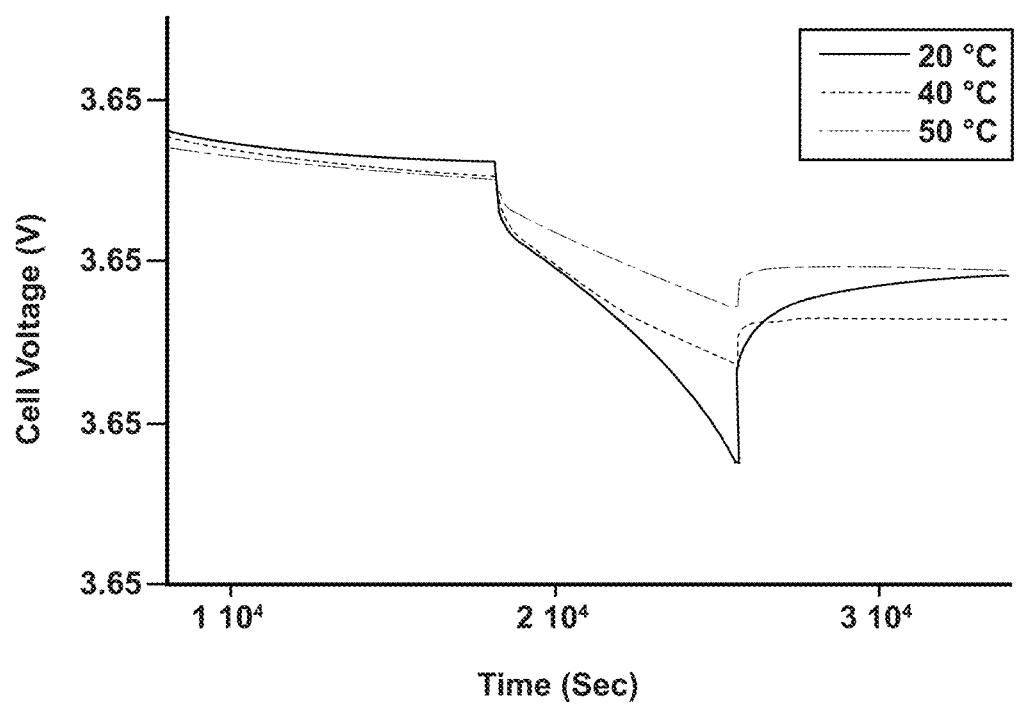
FIG. 10 shows charging and relaxation of the cell at x=1 in $Na_{3-x}Fe_{0.3}V1.7O(PO_4)_2F_2$ at different temperatures and relaxation cell voltage was fitted to determine the relaxation time for ionic diffusivity.
Figure 11A:
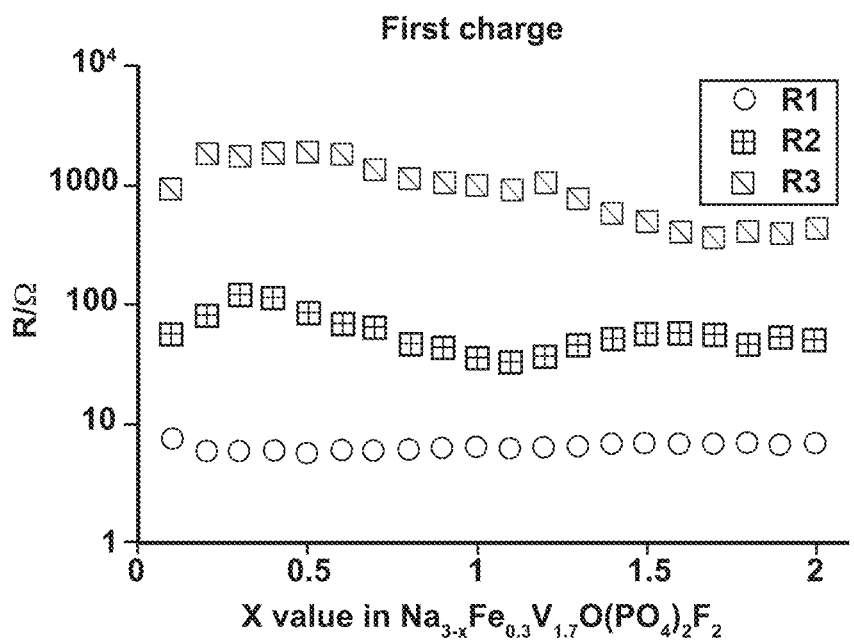
FIG. 11A shows evolution of different resistances separated from the half-cell configuration Na/electrolyte/$Na_3Fe_{0.3}V_{1.7}O(PO_4)_2F_2$ in the first cycle.
Figure 11B:
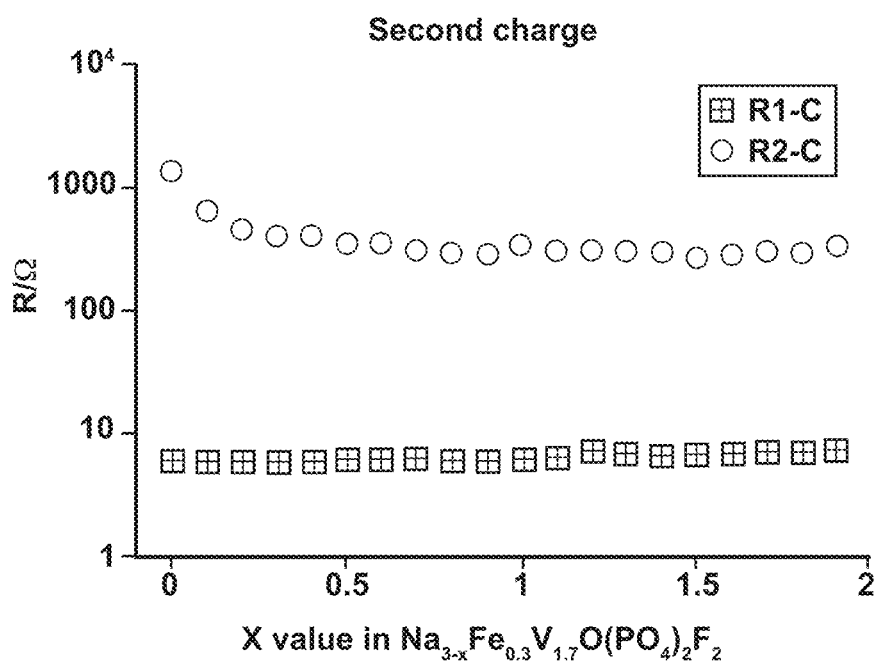
FIG. 11B shows evolution of different resistances separated from the half-cell configuration Na/electrolyte/$Na_3Fe_{0.3}V_{1.7}O(PO_4)_2F_2$ in the second cycle.

Different resistance processes were separated by fitting the spectra using the equivalent circuit shown in FIG. 10 and the obtained data for the semicircles are displayed in FIGS. 11A and 11B as a function of the SOC along with the electrolyte ohmic resistance (R1).

To demonstrate evidence that can help distinguish between the charge transfer resistance processes at metallic sodium/electrolyte and $Na_{3-x}Fe_{0.3}V_{1.7}O(PO_4)_2F_2$/electrolyte interfaces, the capacitance value was examined, which was much lower at the Na/electrolyte interface than at the $Na_{3-x}Fe_{0.3}V_{1.7}O(PO_4)_2F_2$/electrolyte interface. The capacitance (C) values were calculated from the fitting parameters Q and n according to the equation C=(R1–nQ)1/n, where Q (CPE-T) is the constant phase element and n (CPE-P) is a measure of the degree of depression of an arc. The average percentage error between experimental and simulated data was 3.5%. The obtained capacitance values were ~5×10-5 F for low-frequency semicircles (R3), whereas the capacitance values of R2 were ~10-7 F. However, charge transfer reaction at the cathode/electrolyte took place at the lower-frequency semicircle. Based on this observation, R3 is at the $Na_{3-x}Fe_{0.3}V_{1.7}O(PO_4)_2F_2$/electrolyte interfacial charge transfer resistance. FIGS. 11A-B show that the resistance R3 gradually decreased with increases in the degree of desodiation, whereas R1 remained almost constant as a function of SOC. The values of interfacial resistances reduced in the second charging cycle from the first charging cycle. The charge transfer resistance decreased gradually with the removal of sodium from the $Na_3Fe_{0.3}V_{1.7}O(PO_4)_2F_2$. The capacity loss in the first charge was significantly large and the measured resistances were consistent with the cycling behavior. The reason for such a change is not clearly understood. Nonetheless, the cell performance is mainly limited by the interfacial charge transfer process. The charge transfer reaction associated at the sodium/electrolyte interface might not have to be varied with the SOC or SOD. However, change of electronic conductivity of the active particle resulted from the partial desodiation might be associated with R2 because of the similar relaxation time constant. The pattern of the R2 value as a function of SOC was very similar to R3; however, the magnitude of R2 was much lower than that of R3. Here, R3 was mainly associated with the $Na_3Fe_{0.3}V1.7O(PO_4)_2F_2$/electrolyte interface because the formation of mixed valence $V^{3+}/V^{4+}$ ($Fe^{2+}/Fe^{3+}$) significantly affected the $Na_3Fe_{0.3}V_{1.7}O(PO_4)_2F_2$/electrolyte interface during the desodiation/sodiation process. FIG. 11A also shows that the resistance R3 was high. This high value of R3 was likely due to agglomerated particle morphology and a relatively small surface area exposed to the electrolyte. The EIS results imply that the interfacial charge transfer resistance was likely rate-limiting in the whole range of sodium concentrations.

During the titration, a sodium concentration gradient was developed across the active particles as the sodium-ion gradually started to remove from the surface of the $Na_3Fe_{0.3}V_{1.7}O(PO_4)_2F_2$ particle. Therefore, a cell voltage polarization occurred, followed by a relaxation of the cell voltage (depolarization) at the OCV conditions, which develop with time. The cells had the magnitude of depolarization voltages of approximately 50 to 70 mV at the beginning to the end of OCV conditions (FIG. 9A). This depolarization cell voltage was fitted with Eq. 1 as the derivative of the depolarization cell voltage vs. the time to obtain the relaxation time. The ionic diffusivity was then calculated via the obtained relaxation time. The diffusion length was considered to be half of the particle diameter as a boundary condition.

Figure 12A:
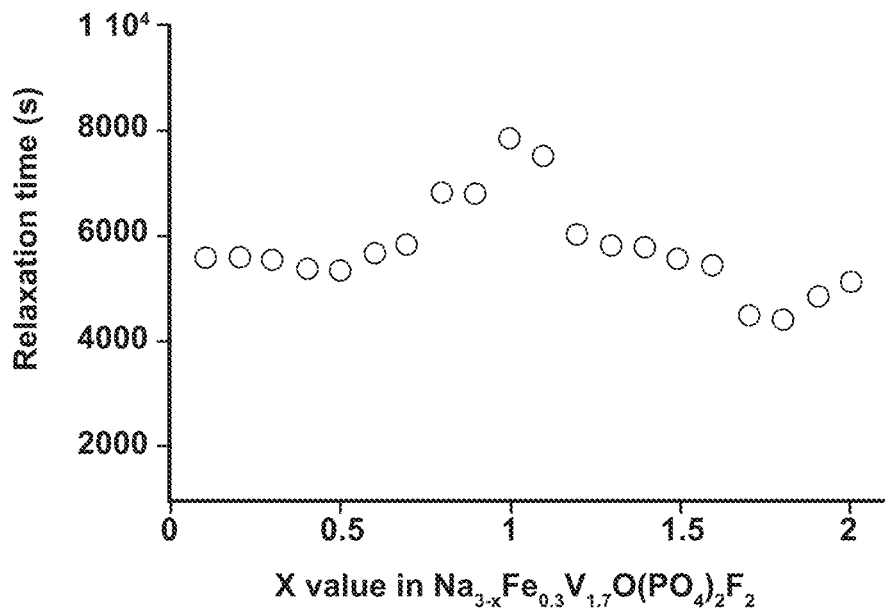
FIG. 12A shows extracted relaxation time obtained by fitting the depolarization cell voltage as a function of sodium content in $Na_3Fe_{0.3}V_{1.7}O(PO_4)_2F_2$.
Figure 12B:
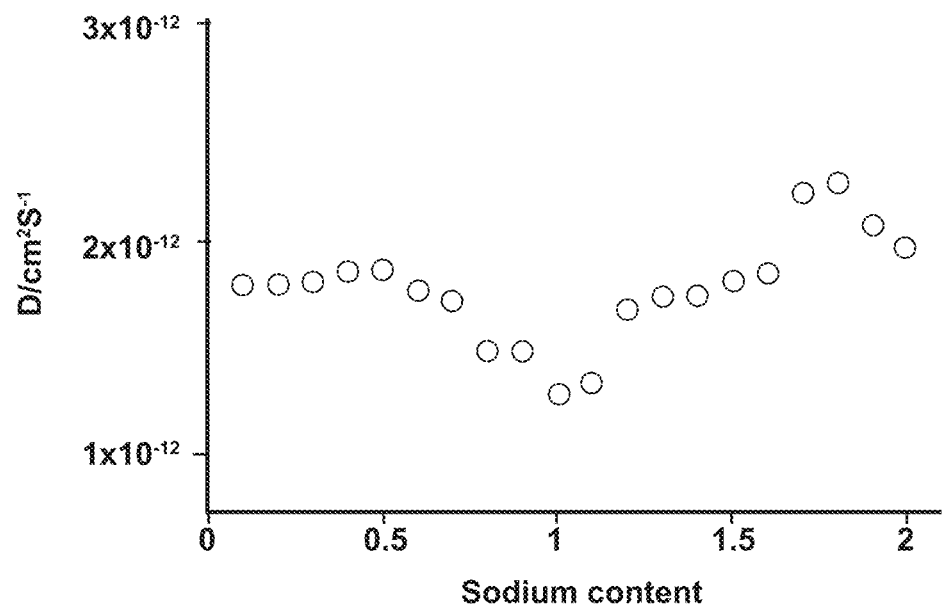
FIG. 12B shows extracted relaxation time obtained by fitting the depolarization cell voltage as a function of sodium content in the sodium-ion diffusivity.

The extracted relation time and sodium-ion diffusivity for the phase is plotted in FIGS. 12A and 12B, respectively, as a function of sodium content at room temperature.

$$\ln(U_{(t)} - U_{(t=\infty)}) = \ln A - \frac{t}{\tau} \qquad (1)$$

A is the constant term for a particular material and U(t) and U(t=∞) are the cell voltage at times (t) and t=∞, respectively. The slope of the plot, $\ln(U_{(t)}-U_{(t=\infty)})$ vs. t, provides the relaxation time, τ. Ionic diffusivity was derived to Eq. 2.

$$D = \frac{L^2}{\tau} \qquad (2)$$

As explained previously, the origin of the depolarization was the development of a sodium concentration gradient across the sample during GITT measurements. The relaxation time followed by sodium-ion diffusivity in $Na_{3-x}Fe_{0.3}V_{1.7}O(PO_4)_2F_2$ showed very complex behavior as a function of sodium content. At X=0.0-0.5, the ionic diffusivity was almost constant and thereafter decreased gradually up to X=1.0; beyond X=1.0, ionic diffusivity started to increase further with gradual removal of sodium. Although this complex behavior has yet to be understood, the diffusion mechanism and surrounding interaction of the sodium-ion might change with the removal of sodium from $Na_3Fe_{0.3}V_{1.7}O(PO_4)_2F_2$. Notably, the ionic diffusivity of $Na_3Fe_{0.3}V_{1.7}O(PO_4)_2F_2$ decreased with the removal of sodium as long as the interstitial diffusion mechanism was active. On the other hand, ionic diffusivity increased with the removal of sodium as long as the diffusion mechanism is active. The obtained sodium-ion diffusivity was around $D=10^{-12}$ cm$^2$/s and did not change significantly with the change of sodium concentration in the material except at X=1.

Figure 13A:
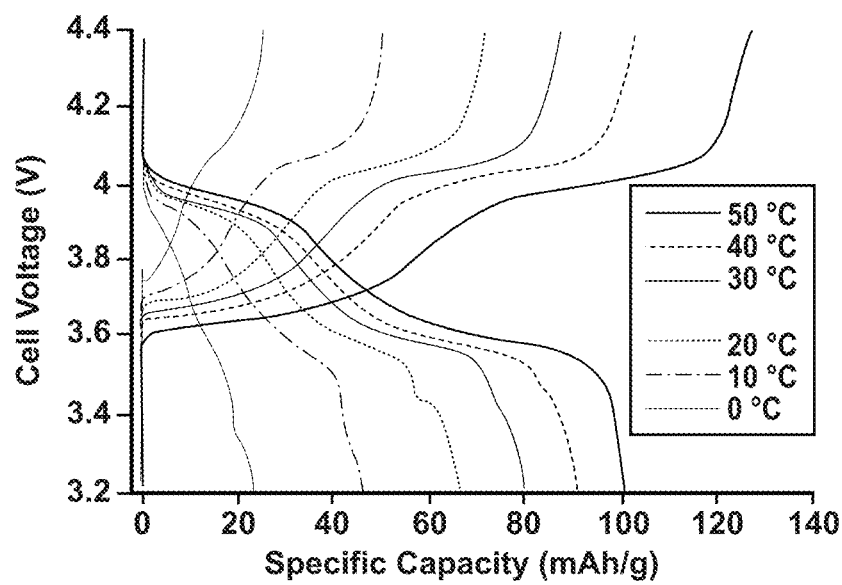
FIG. 13A shows a charge-discharge profile of $Na_{3-x}Fe_{0.3}V_{1.7}(PO_4)_2OF_2$.
Figure 13B:
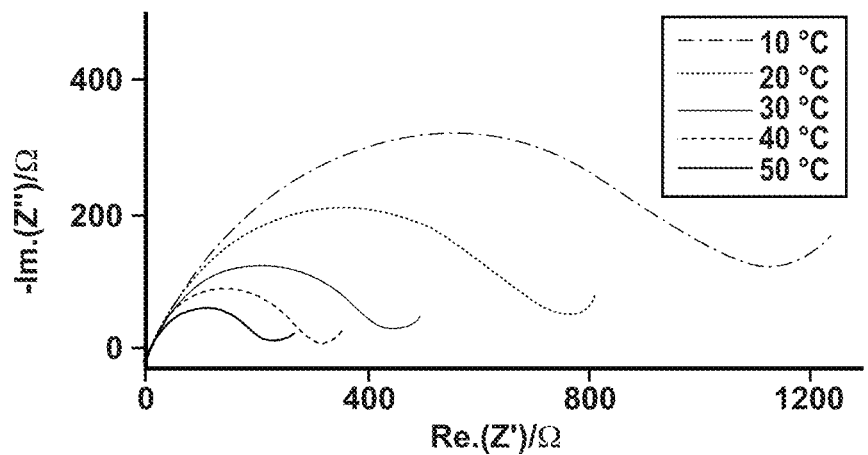
FIG. 13B shows impedance spectra at different temperatures.
Figure 13C:
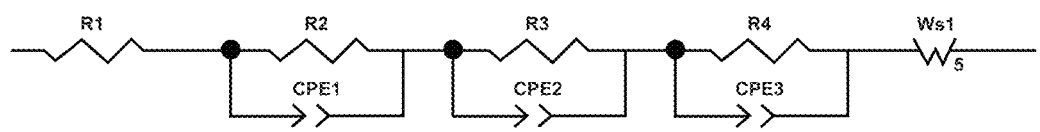
FIG. 13C shows equivalent circuit used to evaluate and separate the different cell resistances.

Activation energy is a model parameter which is not known for the $Na_3Fe_{0.3}V_{1.7}O(PO_4)_2F_2$ material. FIG. 13A shows the charge/discharge profile of $Na_{3-x}Fe_{0.3}V_{1.7}O(PO_4)_2F_2$ in the 0 to 50° C. temperature range to check the compatibility of its electrochemical performance at extreme conditions. FIG. 13A shows that the electrochemical performance at a lower temperature interval was very poor and the cell resistance increased exponentially with decreasing temperature. (FIG. 13B). This behavior is another indication that electrochemical performance was limited by interfacial kinetics. To reveal this behavior, the impedance spectra was measured at a sodium concentration of X=1 at different temperatures. The impedance spectra were similar, as shown in FIG. 13B, and the cell voltage relaxation at selected temperatures are shown in FIG. 13C. The same charging and relaxation protocols were followed as discussed previously.

Figure 14A:
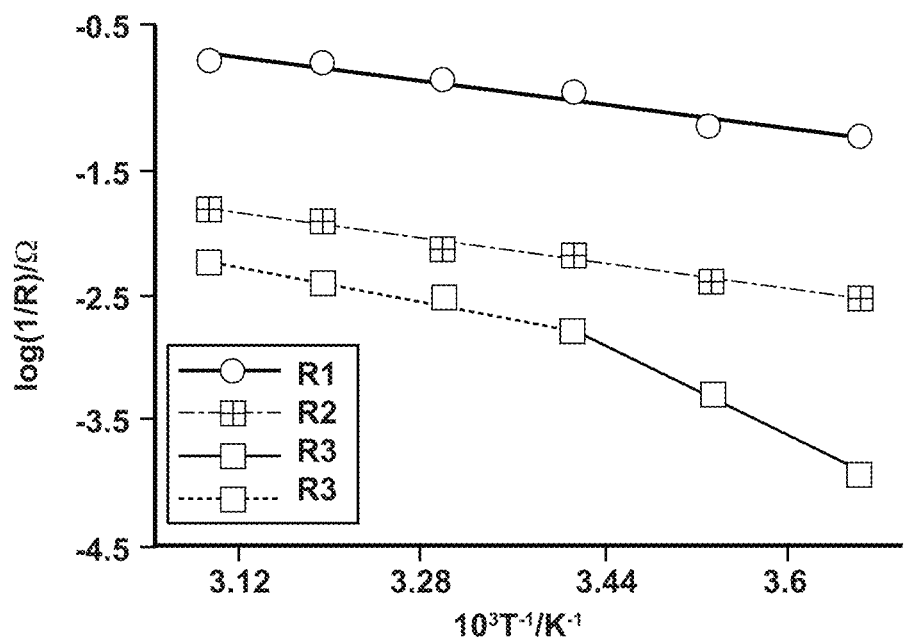
FIG. 14A shows an evolution of interfacial resistances.
Figure 14B:
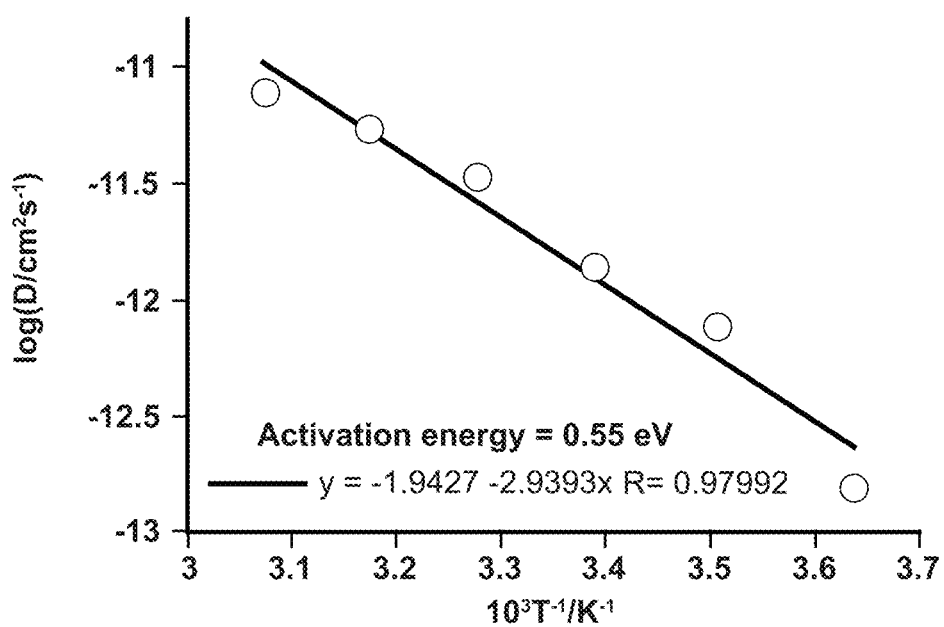
FIG. 14B shows ionic diffusivity of $Na_{3-x}Fe_{0.3}V_{1.7}O(PO_4)_2F_2$ at x=1 measured as a function of inverse temperature to obtain activation energy.

The ionic diffusivity and interfacial resistances were plotted as a function of inverse temperature in FIGS. 14A and 14B. The obtained different activation energies are compared in Table 3. The activation energy due to sodium-ion diffusion is 0.55 eV and the activation energy of ionic diffusion for $Na_{3-x}Fe_{0.3}V_{1.7}O(PO_4)_2F_2$ has not been reported. However, the activation energy of the ionic conduction of $Na_3V_2(PO_4)^2F^3$ has been reported to be 0.68 eV, which is consistent with the obtained value. The activation energy due to the ionic conductivity of the electrolyte solution (R1), charge transfer resistance at Na/electrolyte (R2), and $Na_{3-x}Fe_{0.3}V_{1.7}O(PO_4)_2F_2$/electrolyte interfaces (R3) were 0.22, 0.26, and 0.33 eV (0.92 eV at lower temperature) respectively. FIG. 14A shows that R3 exhibited two slopes in the measured temperature window. The charge particles (electron, hole, and vacancy) association might have happened at a lower temperature interval, which hindered interfacial kinetics at $Na_{3-x}Fe_{0.3}V_{1.7}O(PO_4)_2F_2$/electrolyte interfaces.

TABLE 3

Comparison of activation energy of different resistance components and ionic diffusivity.

| Resistance components | Activation energy (eV) |
|---|---|
| R1 | 0.22 |
| R2 | 0.26 |
| R3 | 0.33 (0.92 at lower T) |
| Ionic diffusion | 0.55 |

Example 3: Measurements of Heat Generation

Figure 1B:
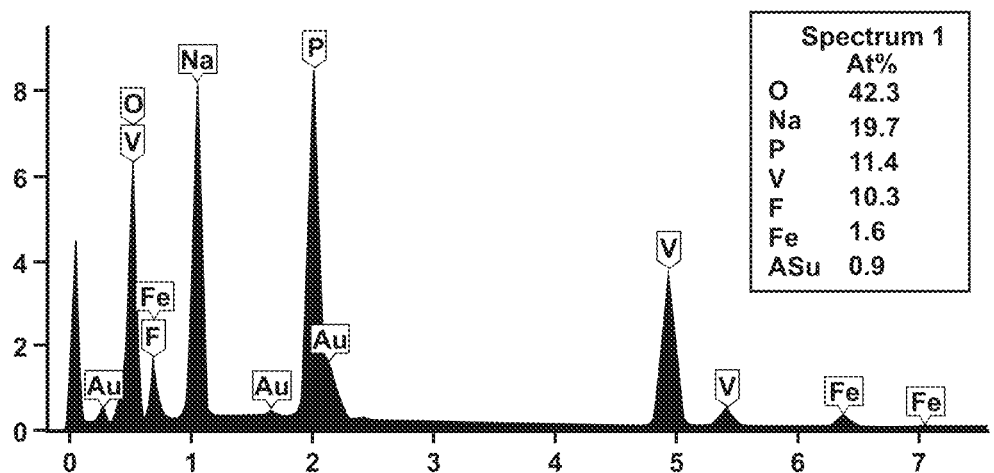
FIG. 1B is a EDX spectrum.
Figure 1C:
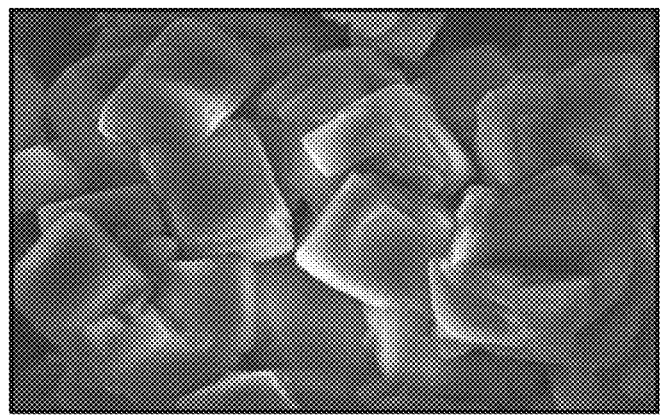
FIG. 1C is a SEM of the synthesized $Na_3Fe_{0.3}V_{1.7}O(PO_4)_2F_2$ powder by a hydrothermal method.
Figure 15:
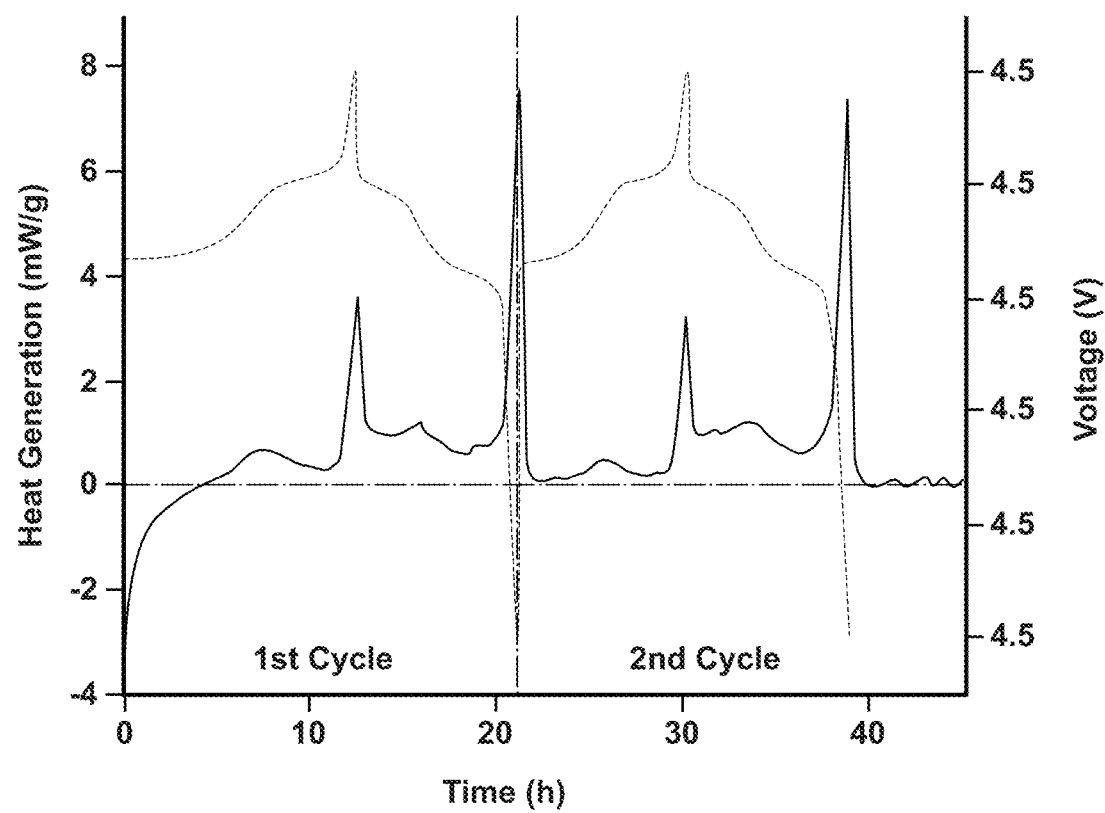
FIG. 15 shows voltage and heat generation profiles of $Na_3Fe_{0.3}V_{1.7}O(PO_4)_2F_2$/Na half-cell as a function of cycling time at 0.1C rate and T=25° C.

FIG. 15 shows the voltage and heat generation profiles of $Na_3Fe_{0.3}V_{1.7}O(PO_4)_2F_2$/Na half-cell during two first charge/discharge cycles at a 0.1C rate. A good reproducibility was indicated except slight decrease of the charging and discharging time on the second cycle. The voltage curve shows two voltage plateaus during charge and discharge, which are correlated to anodic and cathodic peaks in FIG. 1 The heat generation increases from negative to positive values along the low voltage plateau during charge then an exothermic and an endotherm peaks were observed in the middle of charge.

These peaks were caused by a phase transition in the cathode, followed by continuous increase of heat. Similar behavior was observed during discharge. This overall heat generation included the contribution of both reversible heat due to entropic change of the cell reaction, and irreversible heat due to overpotential corresponding to ohmic losses in the cell, charge-transfer at the interface, and mass transfer limitations. At the end of each discharge, the heat generation increased sharply up to 7.6 mW/g, which was mainly due to the dominance of the irreversible heat over the reaction heat. Polarization of the electrode significantly increased the overpotential and ohmic resistance, which was also indicated by the GITT measurements.

Figure 16A:
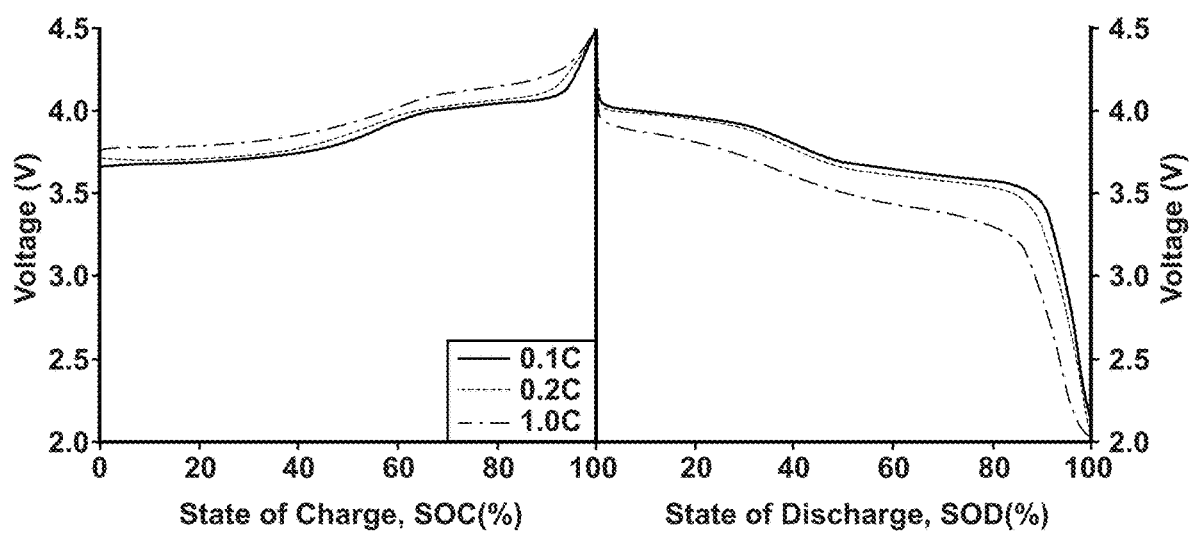
FIG. 16A shows voltage profiles of the $Na_3Fe_{0.3}V_{1.7}O(PO_4)_2F_2$/Na half-cell cycled at different charge/discharge rates (0.1C, 0.2C, and 0.1C) and T=25° C.
Figure 16B:
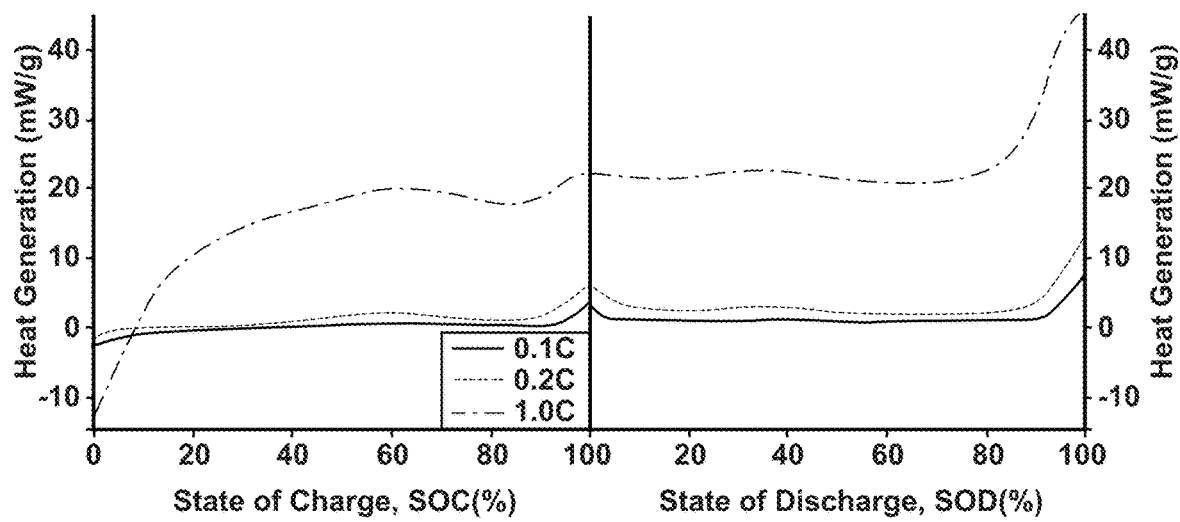
FIG. 16B shows heat profiles of the $Na_3Fe_{0.3}V_{1.7}O(PO_4)_2F_2$/Na half-cell cycled at different charge/discharge rates (0.1C, 0.2C, and 0.1C) and T=25° C.

FIGS. 16A-B show the voltage and heat generation of the $Na_3Fe_{0.3}V_{1.70}O(PO_4)_2F_2$ cathode at 0.1C, 0.2C, and 1.0C rates as a function of the SOCs for the charging process and SODs for the discharging process. FIG. 16A shows that the voltage curves for cells tested at 0.1C and 0.2C rates were nearly collapsed onto the same curves when plotted against SOC and SOD, respectively. However, the voltage curves for cells tested at the 1.0C rate appeared to be higher during the charge and lower during the discharge because of the overpotential increase at high cycling rate. During both charge and discharge processes, the heat generation increased with increasing the current rate (FIG. 16B). Endothermic and exothermic heat generation were observed at low and moderate current rates (0.1C and 0.2C) because both reversible and irreversible heats contribute to total heat generation at low and moderate current rates. However, only exothermic heat was observed at the high current rate (1.0C) because usually, the irreversible heat dominates the heat generation at a high current rate. Table 4 summarizes the heat accumulation data of the $Na_3Fe_{0.3}V_{1.7}O(PO_4)_2F_2$ cathode during charge/discharge at different C rates. The accumulated heat was calculated by integrating the heat curves in charge and discharge processes. The amount of heat was increased with charge/discharge rate. The generated heat during discharge process increased by 27% from 0.1C to 0.2C. However, at the 1.0C rate, the generated heat increased by 89%, which was mainly due to the dominance of the irreversible heat over the reversible heat because of the significant increase of the overpotential caused by the rise of the ohmic resistance and also electrode polarization.

TABLE 4

Accumulated heat of the $Na_3Fe_{0.3}V_{1.70}(PO_4)_2F_2$ cathode during charge/discharge at different C rates and T = 25° C.

| Charge/dis-charge rate (C) | Accumulated heat during charge (mJ) | Accumulated heat during discharge (mJ) |
|---|---|---|
| 0.1 | 158 | 297 |
| 0.2 | 244 | 378 |
| 1.0 | 424 | 542 |

Figure 17A:
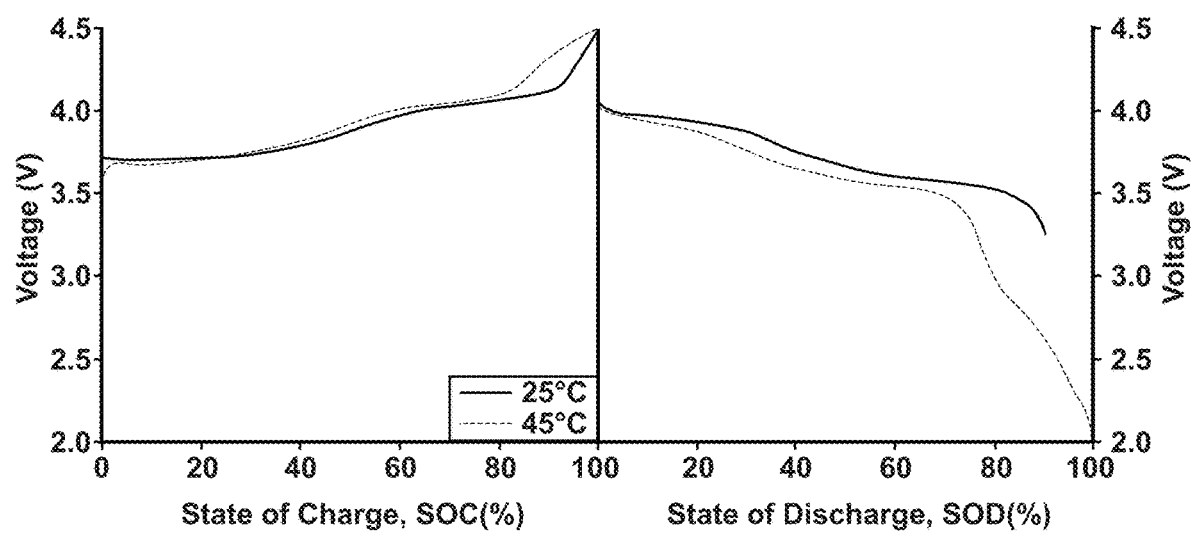
FIG. 17A shows voltage profiles of $Na_3Fe_{0.3}V_{1.7}O(PO_4)_2F_2$/Na half-cell cycled at a 0.2C rate for T=25° C. and T=45° C.
Figure 17B:
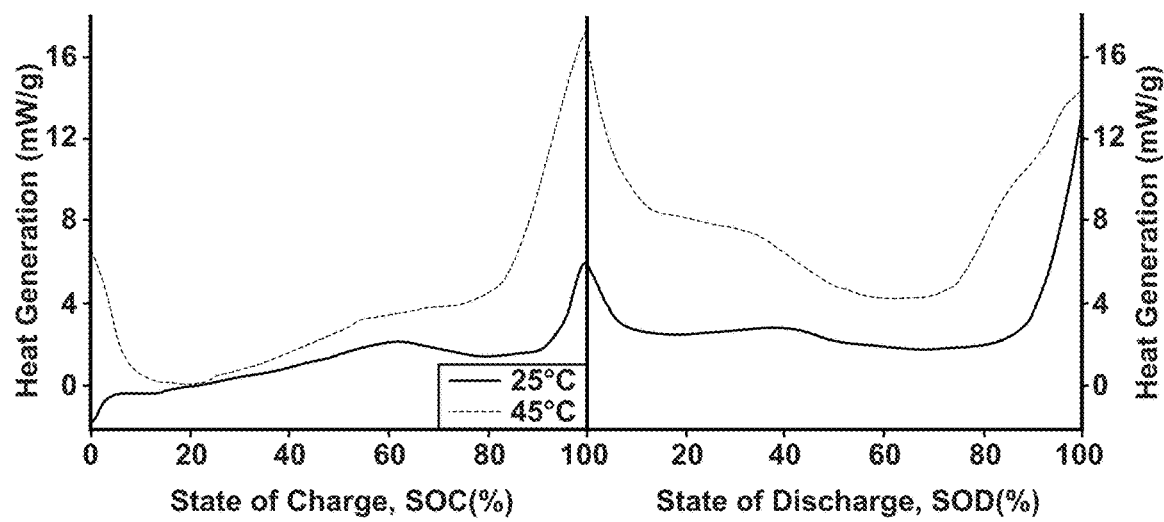
FIG. 17B shows heat generation profiles of $Na_3Fe_{0.3}V_{1.7}O(PO_4)_2F_2$/Na half-cell cycled at a 0.2C rate for T=25° C. and T=45° C.

A comparison of the voltage and the heat generation of the $Na_3Fe_{0.3}V_{1.7}O(PO_4)_2F_2$/Na half-cell cycled at a 0.2C current rate for 25 and 45° C. are shown in FIGS. 17A-B. The voltage profiles showed remarkably measurable variation at both charge and discharge. The largest voltage deviation appeared between 75% and 95% SOD (FIG. 17A), likely due to a capacity fade at high temperature.

The results in Table 4 show that the charge and discharge capacities corresponding with the same rate decreased with the increase of the temperature. Additionally, the heat generation in 65-100% SOC was quite high for the cell tested at 45° C. Also, the heat generation increased significantly with the temperature during the discharge process.

Figure 18A:
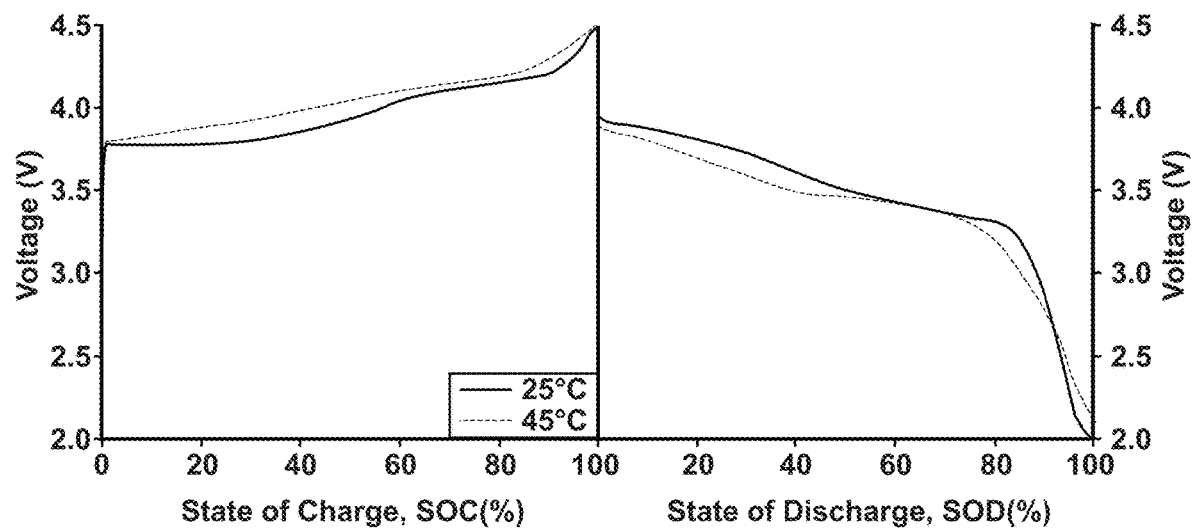
FIG. 18A shows voltage profiles of the $Na_3Fe_{0.3}V_{1.7}O(PO_4)_2F_2$/Na half-cell cycled at a 1.0C rate for T=25° C. and T=45° C.
Figure 18B:
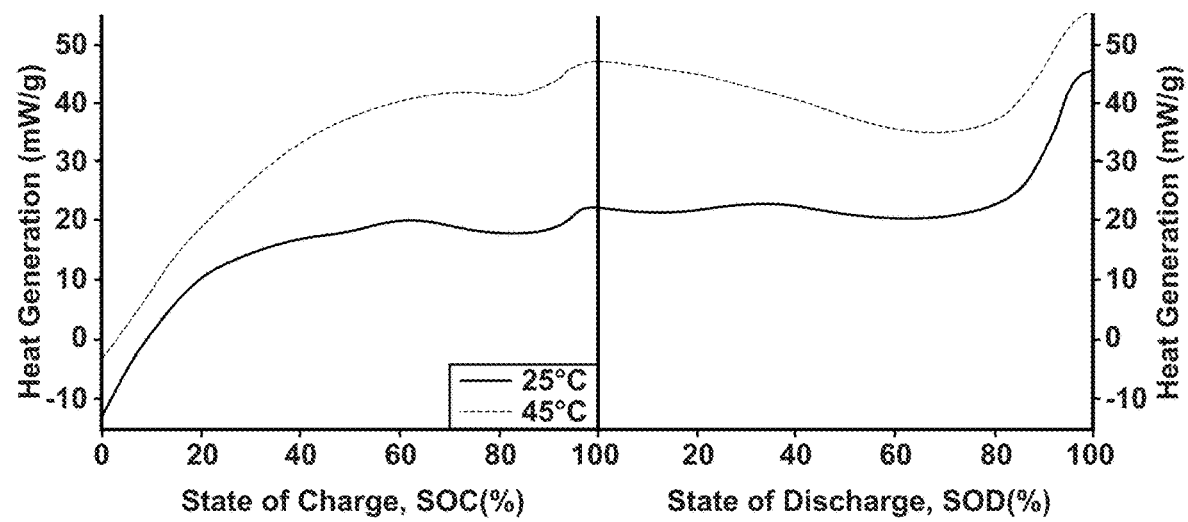
FIG. 18B shows heat generation profiles of the $Na_3Fe_{0.3}V_{1.7}O(PO_4)_2F_2$/Na half-cell cycled at a 1.0C rate for T=25° C. and T=45° C.

FIGS. 18A-B presents a comparison of voltage and heat generation for the $Na_3Fe_{0.3}V_{1.7}O(PO_4)_2F_2$ cathode cycled under a 1.0C rate. The voltage profiles during charge and discharge showed differences due to a significant decrease of capacities (FIG. 18A and Table 5). Comparing results in FIG. 18B, the heat generation during charge and discharge processes clearly increased significantly with increasing temperature, which is mainly caused by the irreversible heat increase at the high rate and temperature. With the increase in the charge/discharge rates, the effect of temperature also became important because of the dominance of the irreversible component over the reversible component.

TABLE 5

Charge/discharge capacity of the $Na_3Fe_{0.3}V_{1.70}(PO_4)_2F_2$/Na half-cell at two different temperatures and discharge rates.

| | Rates | | | |
|---|---|---|---|---|
| | 0.2 C | | 1.0 C | |
| Temperature | Charge capacity (mAh/g) | Discharge capacity (mAh/g) | Charge capacity (mAh/g) | Discharge capacity (mAh/g) |
| 25° C. | 130 | 128 | 123 | 118 |
| 45° C. | 124 | 115 | 119 | 110 |

CONCLUSION

A new iron-doped sodium vanadium oxyflurophosphate $Na_3Fe_{0.3}V_{1.7}O(PO_4)_2F_2$ cathode material was synthesized by the hydrothermal method described above, and its electrochemical performances were examined in half- and full-cell configurations. The electrochemical half-cell performances were examined using three different electrolyte formulations; DMC-EC-PC, DEC-EC, and EC-PC, which exhibited excellent stability at room temperature. The capacity loss was around 15% and the columbic efficiency was 99% after 100 cycles with DMC-EC-PC. The $NaTi_2(PO_4)_3$-MWCNT vs. $Na_3Fe_{0.3}V_{1.7}O(PO_4)_2F_2$ full-cell delivered an excellent initial discharge capacity of 80 mAh/g. EIS measurements revealed that charge transfer kinetics played a major role for the electrochemical rate performances of $Na_3Fe_{0.3}V_{1.7}O(PO_4)_2F_2$. The sodium-ionic diffusivity was around $10\text{-}12\ cm^2s^{-1}$ and did not change significantly with changed sodium content (SOC). An electrochemical isothermal calorimetry measurement was also performed to understand the effects of the charge/discharge rate and temperature on heat generation behavior of the $Na_3Fe_{0.3}V_{1.7}O(PO_4)_2F_2$/Na half-cell. Joule heat and reaction heat were the main heat sources, which depended largely on the operating conditions, including SOC/SOD, charge/discharge rate, and cycling temperature. The generated heat increased at high charge/discharge rates and high temperatures because of the dominance of irreversible heat at high C rates and high temperatures. Based on the experimental results, it is believed that the choice of appropriate operating charge/discharge rate and cycling temperature will affect the thermal stability of this electrode, which may play a key role in overall sodium-ion cell safety.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

What is claimed is:

1. A positive electrode for a sodium ion battery, the positive electrode comprising a sodium metal vanadium fluorophosphate having a formula according to Formula I:

$$Na_3V_{2-x}M_xO_y(PO_4)_2F_{3-y} \qquad \text{I;}$$

wherein $0.5 < x \le 0.7$, $0.001 < y \le 1$, and M is one or more additional metals selected from iron (Fe), chromium (Cr), indium (In), titanium (Ti), manganese (Mn), yttrium (Y), gallium (Ga), or combinations thereof.

2. The positive electrode of claim 1, wherein the additional metal is a trivalent metal.

3. The positive electrode of claim 1, wherein the vanadium of the sodium metal vanadium fluorophosphate comprises vanadium having an oxidation state of +3.

4. A method of forming the sodium metal vanadium fluorophosphate of claim 1, the method comprising:
combining sodium, vanadium, the additional metal, fluorine, and a phosphate in an aqueous solvent to form a mixture; and
heating the mixture to form the sodium vanadium fluorophosphate.

5. The method of claim 4, wherein the sodium comprises sodium fluoride (NaF), NaOH, $Na_2CO_3$, NaCl, $Na_2O$, sodium acetate ($C_2H_3NaO_2$), trisodium citrate ($Na_3C_6H_5O_7$), sodium oxalate ($Na_2C_2O_4$), or combinations thereof.

6. The method of claim 4, wherein the vanadium comprises ammonium metavanadate ($NH_4VO_3$), $V_2O_5$, $V_2O_3$, $VO_2$, vanadium (III) chloride ($VCl_3$), $VOSO_4 \cdot XH_2O$, vanadyl acetate ($C_4H_8O_5V$), vanadium oxalate ($C_4H_4O_8V$), vanadium acetylacetonate, or combinations thereof.

7. The method of claim 4, wherein the additional metal comprises iron (Fe), chromium (Cr), aluminum (Al), indium (In), titanium (Ti), manganese (Mn), yttrium (Y), gallium (Ga), or combinations thereof.

8. The method of claim 7, wherein the iron comprises $Fe(NO_3)_3 \cdot 9H_2O$, $FeCl_3 \cdot nH_2O$, $Fe(SO_4) \cdot nH_2O$, Ferric acetate $C_6H_9FeO_6$, Ferric oxalate $C_6Fe_2O_{12}$, or combinations thereof.

9. The method of claim 4, wherein the fluorine comprises sodium fluoride (NaF), ammonium fluoride ($NH_4F$), hydrogen fluoride (HF), or combinations thereof.

10. The method of claim 4, wherein the phosphate comprises $NH_4H_2PO_4$, $(NH_4)_2HPO_4$, $H_3PO_4$, $H_3PO_3$, or combinations thereof.

11. The method of claim 4, wherein the step of combining comprises:
combining the vanadium, a reducing agent, and the additional metal to form a first solution;
combining the sodium, the fluorine, and the phosphate to form a second solution; and
combining the first solution and the second solution to form the mixture.

12. The method of claim 11, wherein the reducing agent comprises citric acid, ascorbic acid, maleic acid, or combinations thereof.

13. The method of claim 11, wherein the step of combining the vanadium, a reducing agent, and the additional metal to form the first solution comprises combining $NH_4VO_3$, citric acid ($C_6H_8O_7$), and iron (III) acetate to form the first solution.

14. The method of claim 11, wherein the step of combining the sodium, the fluorine, and the phosphate to form the second solution comprises combining NaF and $NH_4H_2PO_4$ to form the second solution.

15. A positive electrode for a sodium ion battery, the positive electrode comprising a sodium metal vanadium fluorophosphate having a formula according to Formula III:

$$Na_3V_{1.7}Fe_{0.3}O(PO_4)_2F_2 \qquad \text{III.}$$

16. The positive electrode of claim 15, wherein the iron of the sodium metal vanadium fluorophosphate comprises iron having an oxidation state of +3.

17. A battery comprising:
a negative electrode; and
a positive electrode comprising a sodium vanadium fluorophosphate, the sodium metal vanadium fluorophosphate having a formula according to Formula I:

$$Na_3V_{2-x}M_xO_y(PO_4)_2F_{3-y} \qquad \text{I;}$$

wherein $0.5 < x \le 0.7$, $0.001 < y \le 1$, and M is one or more additional metals selected from iron (Fe), chromium (Cr), indium (In), titanium (Ti), manganese (Mn), yttrium (Y), gallium (Ga), or combinations thereof.

18. The battery of claim 17 further comprising an electrolyte in contact with the negative electrode and the positive electrode, wherein the electrolyte is a salt selected from the group of $NaPF_6$, $NaClO_4$, $NaBF_4$, and combinations thereof.

19. The battery of claim 18, wherein the electrolyte salt is in the presence of a solvent selected from the group of ethylene carbonate (EC), propylene carbonate (PC), dimethyl carbonate (DMC), diethyl carbonate (DEC), and combinations thereof.

20. The battery of claim 17, wherein the negative electrode comprises a sodium-containing compound, a hard carbon, antimony (Sb), Sb@C, or a combination thereof.

21. The battery of claim 20, wherein the sodium-containing compound comprises sodium phosphate.

22. The battery of claim 21, wherein the sodium phosphate has a formula according to Formula IV:

$$NaTi_2(PO_4)_3 \qquad \text{IV.}$$

23. The battery of claim 20, wherein the hard carbon comprises multi-walled carbon nanotubes.

24. A battery comprising:
a negative electrode; and
a positive electrode comprising a sodium vanadium fluorophosphate, the sodium metal vanadium fluorophosphate having a formula according to Formula III:

$$Na_3V_{1.7}Fe_{0.3}O(PO_4)_2F_2 \qquad \text{III.}$$

* * * * *